United States Patent
Fäcke et al.

(10) Patent No.: US 9,073,296 B2
(45) Date of Patent: Jul. 7, 2015

(54) LAMINATE STRUCTURE COMPRISING A PROTECTIVE LAYER AND AN EXPOSED PHOTOPOLYMER LAYER

(71) Applicant: Bayer Intellectual Property GmbH, Monheim (DE)

(72) Inventors: Thomas Fäcke, Leverkusen (DE); Friedrich-Karl Bruder, Krefeld (DE); Thomas Rölle, Leverkusen (DE); Marc-Stephan Weiser, Leverkusen (DE); Dennis Hönel, Zülpich (DE); Horst Berneth, Leverkusen (DE); Ute Flemm, Solingen (DE)

(73) Assignee: Bayer Intellectual Property GmbH, Monheim (DE)

( * ) Notice: Subject to any disclaimer, the term of this patent is extended or adjusted under 35 U.S.C. 154(b) by 176 days.

(21) Appl. No.: 13/733,268

(22) Filed: Jan. 3, 2013

(65) Prior Publication Data
US 2013/0177746 A1  Jul. 11, 2013

(30) Foreign Application Priority Data
Jan. 5, 2012 (EP) ................................. 12150275

(51) Int. Cl.
*G03H 1/02* (2006.01)
*B32B 27/40* (2006.01)
(Continued)

(52) U.S. Cl.
CPC ......... *B32B 27/40* (2013.01); *Y10T 428/24802* (2015.01); *G11B 7/24044* (2013.01);
(Continued)

(58) Field of Classification Search
CPC ...... B32B 27/40; B42D 25/328; B42D 25/29; G03H 1/0252; G03H 2001/186; G03H 2250/39; G03H 2260/12; G11B 7/245; G11B 7/24044
See application file for complete search history.

(56) References Cited

U.S. PATENT DOCUMENTS 5,024,909 A * 6/1991 Smothers et al. ............. 430/1
5,182,180 A * 1/1993 Gambogi et al. ............. 430/1
(Continued)

FOREIGN PATENT DOCUMENTS

JP   2012-201016   * 10/2012

OTHER PUBLICATIONS

Zager et al. "Display holograms is Du Pont's OmnidexTM films", Proc SPIE vol. 1461 pp. 58-67 (1991).*

*Primary Examiner* — Martin Angebranndt
(74) *Attorney, Agent, or Firm* — Drinker Biddle & Reath LLP

(57) ABSTRACT

The present invention relates to a laminate structure comprising a protective layer and an exposed photopolymer layer, the laminate structure being obtainable by reacting at least one radiation-curing resin I), an isocyanate-functional resin II) and a photoinitiator system III), and the radiation-curing resin I) containing ≤5% by weight of compounds having a weight-average molecular weight of <500 and ≥75% by weight of compounds having a weight-average molecular weight of >1000, the isocyanate-functional resin II) containing ≤5% by weight of compounds having a weight-average molecular weight of <500, and the protective layer containing the radiation-curing resin I) at least to an extent of 80% by weight and the isocyanate-functional resin II) at most to an extent of 15% by weight. The invention further provides a process for producing the inventive laminate structure.

25 Claims, 2 Drawing Sheets

(51) Int. Cl.
  *G11B 7/24044* (2013.01)
  *G11B 7/245* (2006.01)
  *B42D 25/29* (2014.01)
  *B42D 25/328* (2014.01)
  *G03H 1/18* (2006.01)

(52) U.S. Cl.
  CPC .............. *G11B7/245* (2013.01); *G03H 1/0252* (2013.01); *G03H 2001/186* (2013.01); *G03H 2250/39* (2013.01); *G03H 2260/12* (2013.01); *B42D 25/29* (2014.10); *B42D 25/328* (2014.10)

(56) References Cited

U.S. PATENT DOCUMENTS

| | | |
|---|---|---|
| 6,150,458 A | 11/2000 | Weikard et al. |
| 6,153,788 A | 11/2000 | Fischer et al. |
| 6,465,539 B1 | 10/2002 | Weikard et al. |
| 2002/0015896 A1 | 2/2002 | Ohtaki et al. |
| 2002/0018253 A1* | 2/2002 | Toshine et al. ............ 359/3 |
| 2002/0142227 A1* | 10/2002 | Dhar et al. ............ 430/1 |
| 2003/0050390 A1 | 3/2003 | Weikard et al. |
| 2005/0013959 A1* | 1/2005 | Ohtaki et al. ............ 428/40.1 |
| 2006/0079660 A1 | 4/2006 | Ludewig et al. |
| 2009/0185470 A1* | 7/2009 | Stoeckel et al. ............ 369/103 |
| 2009/0262407 A1* | 10/2009 | Dausmann et al. ............ 359/27 |
| 2009/0286165 A1* | 11/2009 | Sugiura ............ 430/2 |
| 2010/0086860 A1* | 4/2010 | Roelle et al. ............ 430/2 |
| 2010/0204434 A1 | 8/2010 | Ludewig et al. |
| 2011/0028754 A1 | 2/2011 | Ludewig et al. |
| 2011/0236803 A1* | 9/2011 | Weiser et al. ............ 430/2 |
| 2012/0136115 A1 | 5/2012 | Peiffer et al. |
| 2012/0214089 A1 | 8/2012 | Honel et al. |
| 2012/0231377 A1 | 9/2012 | Weiser et al. |

* cited by examiner

Figure 2 shows the measurement arrangement for testing of the holographic properties for wavelengths of 635 and 532 nm.

Figure 3 shows the elliptical shape of a hologram written in Figure 2.

LAMINATE STRUCTURE COMPRISING A PROTECTIVE LAYER AND AN EXPOSED PHOTOPOLYMER LAYER

CROSS-REFERENCE TO RELATED APPLICATIONS

This application claims the benefit of European Application No. 12150275.1, filed Jan. 5, 2012, which is incorporated herein by reference.

BACKGROUND OF THE INVENTION

The present invention relates to a laminate structure comprising a protective layer and an exposed photopolymer layer, and to a process for producing the laminate structure. Photopolymer layers of the type mentioned at the outset for production of holographic media are known from WO 2011/054797 and WO 2011/067057. Advantages of these holographic media is the high light diffraction efficiency thereof and that no subsequent processing steps are needed after holographic illumination, for example chemical or thermal development steps.

DE 699 37 920 T2 states that holographic photopolymer layers can change colour when substances swell into the photopolymer layer from adjacent layers, such as adhesive layers, or bleed out of this layer into the adjacent layer. If one of the two phenomena occurs, there may be an expansion in volume or a shrinkage in volume in the photopolymer layer. This in turn leads to a long-wave or short-wave colour shift in the hologram. Especially in the case of multicolour holograms, this brings about unwanted visual colour changes.

In order to avoid changes in volume and the associated changes in colour, DE 699 37 920 T2 teaches adding sufficient amounts of the swelling or bleeding substances to the adjacent layers and/or to the photopolymer layer beforehand. This process, however, is costly and inconvenient. Furthermore, according to which material is to be used for the adjacent layer, an adjustment has to be made. Finally, the added substance must also be selected such that it does not destroy the photopolymer layer.

It was therefore an object of the present invention to provide a laminate structure comprising a protective layer and an exposed photopolymer layer, which can be produced in a simple manner and can be bonded to a wide variety of different adjacent layers, for example adhesive layers, without resulting in any changes in volume of the photopolymer layer and therefore any associated changes in the colour of the hologram.

This object is achieved by a laminate structure comprising a protective layer and an exposed photopolymer layer, the laminate structure being obtainable by reacting at least one radiation-curing resin I), an isocyanate-functional resin II) and a photoinitiator system III), and the radiation-curing resin I) containing ≤5% by weight of compounds having a weight-average molecular weight of <500 and ≥75% by weight of compounds having a weight-average molecular weight of >1000, the isocyanate-functional resin II) containing ≤5% by weight of compounds having a weight-average molecular weight of <500, and the protective layer containing the radiation-curing resin I) at least to an extent of 80% by weight and the isocyanate-functional resin II) at most to an extent of 15% by weight.

EMBODIMENTS OF THE INVENTION

An embodiment of the present invention is a laminate structure comprising a protective layer and an exposed photopolymer layer, the laminate structure being obtainable by reacting at least one radiation-curing resin I);
an isocyanate-functional resin II); and
a photoinitiator system III),
wherein the radiation-curing resin I) containing up to 5% by weight of compounds having a weight-average molecular weight of less than 500 and 75% or more by weight of compounds having a weight-average molecular weight of more than 1000, the isocyanate-functional resin II) containing up to 5% by weight of compounds having a weight-average molecular weight of less than 500, and the protective layer containing the radiation-curing resin I) at least to an extent of 80% by weight and the isocyanate-functional resin II) at most to an extent of 15% by weight.

Another embodiment of the present invention is the above laminate structure, wherein the photopolymer layer comprises crosslinked matrix polymers A) obtainable by reacting at least one polyisocyanate component a) and an isocyanate-reactive component b), crosslinked writing monomers B), a photoinitiator C) and a catalyst D).

Another embodiment of the present invention is the above laminate structure, wherein the radiation-curing resin I) comprises at least one polyester, polyether, polycarbonate and/or polyurethane-containing binder having free-radically polymerizable groups.

Another embodiment of the present invention is the above laminate structure, wherein the free-radically polymerizable groups are acryloyl, methacryloyl, allyl, vinyl, maleyl, and/or fumaryl groups, preferably acryloyl and/or methacryloyl groups, and most preferably acryloyl groups.

Another embodiment of the present invention is the above laminate structure, wherein the radiation-curing resin I) comprises at least one compound selected from the group of the polyether acrylates, polyester acrylates, aliphatic urethane acrylates, aromatic urethane acrylates and epoxy acrylates, and at least one aliphatic urethane acrylate and/or at least one aromatic urethane acrylate.

Another embodiment of the present invention is the above laminate structure, wherein the radiation-curing resin I) contains up to 4% by weight of compounds having a weight-average molecular weight of less than 500 and 77% or more by weight of compounds having a weight-average molecular weight of more than 1000, and preferably contains up to 3.5% by weight of compounds having a weight-average molecular weight of less than 500 and 79% or more by weight of compounds having a weight-average molecular weight of more than 1000.

Another embodiment of the present invention is the above laminate structure, wherein the isocyanate-functional resin II) comprises at least one aliphatic, araliphatic, aliphatic or aromatic isocyanate-containing binder.

Another embodiment of the present invention is the above laminate structure, wherein the isocyanate-containing binder is an isocyanate-functional prepolymer comprising reacting a polyfunctional alcohol with an excess of diisocyanate.

Another embodiment of the present invention is the above laminate structure, wherein the isocyanate-functional resin II) additionally has (meth)acrylate groups.

Another embodiment of the present invention is the above laminate structure, wherein the isocyanate-functional resin II) contains up to 4% by weight, more preferably up to 3% by weight of compounds having a weight-average molecular weight of less than 500.

Another embodiment of the present invention is the above laminate structure, wherein the protective layer contains from 3% to 15% by weight of the isocyanate-functional resin II), preferably contains from 5% to 15% by weight of the isocyanate-functional resin II), and more preferably contains from 8% to 12% by weight of the isocyanate-functional resin II).

Another embodiment of the present invention is the above laminate structure, wherein the photoinitiator system III) comprises at least one compound selected from the group of 2-hydroxyphenyl ketones, 1-hydroxycyclohexyl phenyl ketone, benzil ketals, benzil dimethyl ketal, acylphosphine oxides, bis(2,4,6-trimethylbenzoyl)phenylphosphine oxide, diacylphosphine oxides, benzophenone and derivatives thereof.

Another embodiment of the present invention is the above laminate structure, characterized in that the writing monomers B) are photochemically crosslinked acrylates.

Another embodiment of the present invention is the above laminate structure, wherein the photopolymer layer comprises additives of the general formula (VII)

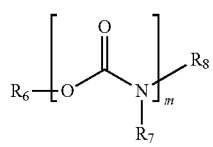

(VII)

where m≥1 and m≤8 and R6, R7, R8 are each independently hydrogen, linear, branched, cyclic or heterocyclic organic radicals which are unsubstituted or optionally substituted, including by heteroatoms, where preferably at least one of the R6, R7, R8 radicals is substituted by at least one fluorine atom and more preferably R6 is an organic radical having at least one fluorine atom.

Another embodiment of the present invention is the above laminate structure, wherein the photopolymer layer comprises a hologram incorporated by exposure.

Another embodiment of the present invention is a process for producing the above laminate structure, comprising applying a mixture at least comprising the radiation-curing resin I), the isocyanate-functional resin II) and the photoinitiator system III) to the exposed photopolymer layer and curing.

Yet another embodiment of the present invention is a security card, a banknote, a printed article, an optical structure, an electronic display, comprising the laminate structure comprising a protective layer and an exposed photopolymer layer, the laminate structure being obtainable by reacting
at least one radiation-curing resin I);
an isocyanate-functional resin II); and
a photoinitiator system III),
wherein the radiation-curing resin I) containing up to 5% by weight of compounds having a weight-average molecular weight of less than 500 and 75% or more by weight of compounds having a weight-average molecular weight of more than 1000, the isocyanate-functional resin II) containing up to 5% by weight of compounds having a weight-average molecular weight of less than 500, and the protective layer containing the radiation-curing resin I) at least to an extent of 80% by weight and the isocyanate-functional resin II) at most to an extent of 15% by weight.

BRIEF DESCRIPTION OF THE DRAWINGS

Those of skill in the art will understand that the drawings, described below, are for illustrative purposes only. The drawings are not intended to limit the scope of the present teachings in any way.

DETAILED DESCRIPTION OF THE INVENTION

Figure 1:
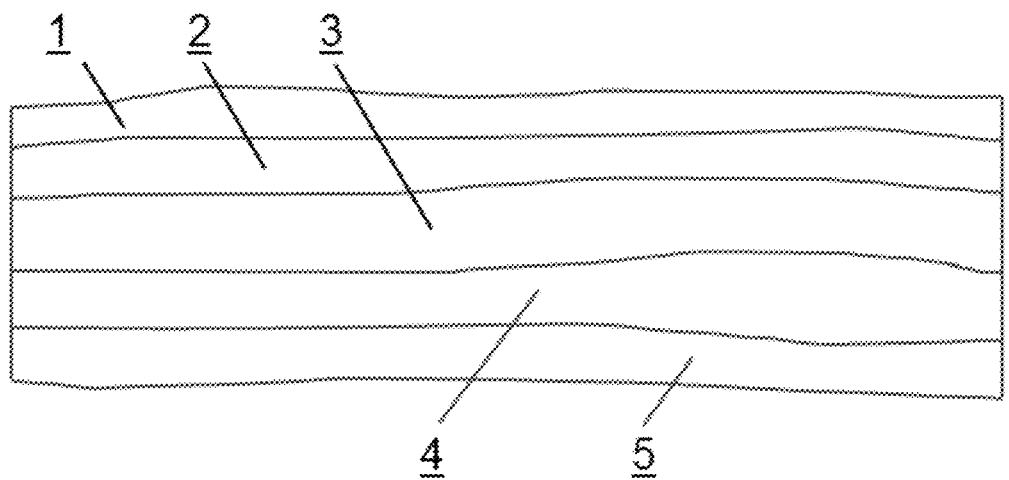
FIG. 1 is an illustration of the five-layer structure.

In a preferred embodiment, the photopolymer layer comprises crosslinked matrix polymers A) obtainable by reacting at least one polyisocyanate component a) and an isocyanate-reactive component b), crosslinked writing monomers B), a photoinitiator C) and a catalyst D).

The polyisocyanate component a) used may be all compounds which have an average of two or more NCO functions per molecule and are well-known to the person skilled in the art, or mixtures thereof. These may have an aromatic, araliphatic, aliphatic or cycloaliphatic basis. It is also possible to use minor amounts of monoisocyanates and/or polyisocyanates containing unsaturated groups.

Suitable examples are butylene diisocyanate, hexamethylene diisocyanate (HDI), isophorone diisocyanate (IPDI), 1,8-diisocyanato-4-(isocyanatomethyl)octane, trimethylhexamethylene 2,2,4- and/or 2,4,4-diisocyanate, the isomeric bis(4,4'-isocyanatocyclohexyl)methane and mixtures thereof with any isomer content, isocyanatomethyloctane 1,8-diisocyanate, cyclohexylene 1,4-diisocyanate, the isomeric cyclohexanedimethylene diisocyanates, phenylene 1,4-diisocyanate, tolylene 2,4- and/or 2,6-diisocyanate, naphthylene 1,5-diisocyanate, diphenylmethane 2,4'- or 4,4'-diisocyanate and/or triphenylmethane 4,4',4''-triisocyanate.

It is likewise possible to use derivatives of monomeric di- or triisocyanates with urethane, urea, carbodiimide, acylurea, isocyanurate, allophanate, biuret, oxadiazinetrione, uretdione and/or iminooxadiazinedione structures.

Preference is given to the use of polyisocyanates based on aliphatic and/or cycloaliphatic di- or triisocyanates.

More preferably, the polyisocyanates of component a) are di- or oligomerized aliphatic and/or cycloaliphatic di- or triisocyanates.

Very particular preference is given to isocyanurates, uretdiones and/or iminooxadiazinediones based on HDI, 1,8-diisocyanato-4-(isocyanatomethyl)octane or mixtures thereof.

It is likewise possible to use, as component a), NCO-functional prepolymers with urethane, allophanate, biuret and/or amide groups. Prepolymers of component a) are obtained in a manner well known to those skilled in the art by reaction of monomeric, oligomeric or polyisocyanates a1) with isocyanate-reactive compounds a2) in suitable stoichiometry with optional use of catalysts and solvents.

Suitable polyisocyanates a1) are all aliphatic, cycloaliphatic, aromatic or araliphatic di- and triisocyanates known to those skilled in the art, and it is unimportant whether they have been obtained by means of phosgenation or by phosgene-free processes. In addition, it is also possible to use the higher molecular weight conversion products, well known per se to those skilled in the art, of monomeric di- and/or triisocyanates with urethane, urea, carbodiimide, acylurea, isocyanurate, allophanate, biuret, oxadiazinetrione, uretdione, iminooxadiazinedione structure, each individually or in any desired mixtures with one another.

Examples of suitable monomeric di- or triisocyanates which can be used as component a1) are butylene diisocyanate, hexamethylene diisocyanate (HDI), isophorone diisocyanate (IPDI), trimethylhexamethylene diisocyanate (TMDI), 1,8-diisocyanato-4-(isocyanatomethyl)octane, isocyanatomethyl-1,8-octane diisocyanate (TIN), 2,4- and/or 2,6-toluene diisocyanate.

The isocyanate-reactive compounds a2) used to form the prepolymers are preferably OH-functional compounds. These are analogous to the OH-functional compounds as described hereinafter for component b).

It is likewise possible to use amines for prepolymer preparation. Suitable examples are ethylenediamine, diethylenetriamine, triethylenetetramine, propylenediamine, diaminocyclohexane, diaminobenzene, diaminobisphenyl, difunctional polyamines, for example the Jeffamines®, amine-terminated polymers having number-average molar masses up to 10 000 g/mol, or any desired mixtures thereof with one another.

To prepare biuret group-containing prepolymers, isocyanate in excess is reacted with amine to form a biuret group. Suitable amines in this case for the reaction with the di-, tri- and polyisocyanates mentioned are all oligomeric or polymeric, primary or secondary, difunctional amines of the type mentioned above.

Preferred prepolymers are urethanes, allophanates or biurets formed from aliphatic isocyanate-functional compounds and oligomeric or polymeric isocyanate-reactive compounds having number-average molar masses of 200 to 10 000 g/mol; particular preference is given to urethanes, allophanates or biurets formed from aliphatic isocyanate-functional compounds and oligomeric or polymeric polyols or polyamines having number-average molar masses of 500 to 8500 g/mol, and very particular preference is given to allophanates formed from HDI or TMDI and difunctional polyether polyols having number-average molar masses of 1000 to 8200 g/mol.

Preferably, the above-described prepolymers have residual contents of free monomeric isocyanate of less than 1% by weight, more preferably less than 0.5% by weight, most preferably less than 0.2% by weight.

It will be appreciated that the polyisocyanate component may contain proportions of further isocyanate components in addition to the prepolymers described. Useful for this purpose are aromatic, araliphatic, aliphatic and cycloaliphatic di-, tri- or polyisocyanates. It is also possible to use mixtures of such di-, tri- or polyisocyanates. Examples of suitable di-, tri- or polyisocyanates are butylene diisocyanate, hexamethylene diisocyanate (HDI), isophorone diisocyanate (IPDI), 1,8-diisocyanato-4-(isocyanatomethyl)octane, 2,2,4- and/or 2,4,4-trimethylhexamethylene diisocyanate (TMDI), the isomeric bis(4,4'-isocyanatocyclohexyl)methanes and mixtures thereof having any desired isomer content, isocyanatomethyl-1,8-octane diisocyanate, 1,4-cyclohexylene diisocyanate, the isomeric cyclohexanedimethylene diisocyanates, 1,4-phenylene diisocyanate, 2,4- and/or 2,6-toluene diisocyanate, 1,5-naphthylene diisocyanate, 2,4'- or 4,4'-diphenylmethane diisocyanate, triphenylmethane 4,4',4''-triisocyanate or derivatives thereof having a urethane, urea, carbodiimide, acylurea, isocyanurate, allophanate, biuret, oxadiazinetrione, uretdione or iminooxadiazinedione structure and mixtures thereof. Preference is given to polyisocyanates based on oligomerized and/or derivatized diisocyanates which have been freed of excess diisocyanate by suitable processes, especially those of hexamethylene diisocyanate. Particular preference is given to the oligomeric isocyanurates, uretdiones and iminooxadiazinediones of HDI and mixtures thereof.

It is optionally also possible for the polyisocyanate component a) to contain proportions of isocyanates which have been partially reacted with isocyanate-reactive ethylenically unsaturated compounds. Preference is given here to using, as isocyanate-reactive ethylenically unsaturated compounds, α,β-unsaturated carboxylic acid derivatives such as acrylates, methacrylates, maleates, fumarates, maleimides, acrylamides, and vinyl ethers, propenyl ethers, allyl ethers and compounds which contain dicyclopentadienyl units and have at least one group reactive toward isocyanates. These are more preferably acrylates and methacrylates having at least one isocyanate-reactive group. Useful hydroxy-functional acrylates or methacrylates include, for example, compounds such as 2-hydroxyethyl (meth)acrylate, polyethylene oxide mono(meth)acrylates, polypropylene oxide mono-(meth)acrylates, polyalkylene oxide mono(meth)acrylates, poly(ε-caprolactone) mono(meth)acrylates, for example Tone® M100 (Dow, USA), 2-hydroxypropyl (meth)acrylate, 4-hydroxybutyl (meth)acrylate, 3-hydroxy-2,2-dimethylpropyl (meth)acrylate, the hydroxy-functional mono-, di- or tetra (meth)acrylates of polyhydric alcohols such as trimethylolpropane, glycerol, pentaerythritol, dipentaerythritol, ethoxylated, propoxylated or alkoxylated trimethylolpropane, glycerol, pentaerythritol, dipentaerythritol or industrial mixtures thereof. In addition, isocyanate-reactive oligomeric or polymeric unsaturated compounds containing acrylate and/or methacrylate groups are suitable, alone or in combination with the abovementioned monomeric compounds. The proportion of isocyanates in the isocyanate component a) which have been partially reacted with isocyanate-reactive ethylenically unsaturated compounds is 0 to 99%, preferably 0 to 50%, more preferably 0 to 25% and most preferably 0 to 15%.

It is optionally also possible for the aforementioned polyisocyanate component a) to contain entirely, or proportions of, isocyanates which have been reacted completely or partially with blocking agents known to the person skilled in the art from coating technology. Examples of blocking agents include: alcohols, lactams, oximes, malonic esters, alkyl acetoacetates, triazoles, phenols, imidazoles, pyrazoles and amines, for example butanone oxime, diisopropylamine, 1,2,4-triazole, dimethyl-1,2,4-triazole, imidazole, diethyl malonate, ethyl acetoacetate, acetone oxime, 3,5-dimethylpyrazole, ε-caprolactam, N-tert-butylbenzylamine, cyclopentanone carboxyethyl ester or any desired mixtures of these blocking agents.

It is especially preferable when the polyisocyanate component is an aliphatic polyisocyanate or an aliphatic prepolymer and preferably an aliphatic polyisocyanate or prepolymer having primary NCO groups.

As polyol component b), it is possible in principle to use all polyfunctional, isocyanate-reactive compounds which have an average of at least 1.5 isocyanate-reactive groups per molecule.

In the context of the present invention, isocyanate-reactive groups are preferably hydroxyl, amino or thio groups; particular preference is given to hydroxyl compounds.

Suitable polyfunctional, isocyanate-reactive compounds are, for example, polyester polyols, polyether polyols, polycarbonate polyols, poly(meth)acrylate polyols and/or polyurethane polyols.

Suitable polyester polyols are, for example, linear polyester diols or branched polyester polyols, as obtained in a known manner from aliphatic, cycloaliphatic or aromatic di- or polycarboxylic acids or their anhydrides with polyhydric alcohols having an OH functionality of ≥2.

Examples of such di- or polycarboxylic acids or anhydrides are succinic acid, glutaric acid, adipic acid, pimelic acid, suberic acid, azelaic acid, sebacic acid, nonanedicarboxylic acid, decanedicarboxylic acid, terephthalic acid, isophthalic acid, o-phthalic acid, tetrahydrophthalic acid, hexahydrophthalic acid or trimellitic acid, and acid anhydrides such as o-phthalic anhydride, trimellitic anhydride or succinic anhydride, or any desired mixtures thereof with one another.

Examples of suitable alcohols are ethanediol, di-, tri- and tetraethylene glycol, 1,2-propanediol, di-, tri- and tetrapropylene glycol, 1,3-propanediol, 1,4-butanediol, 1,3-butanediol, 2,3-butanediol, 1,5-pentanediol, 1,6-hexanediol, 2,2-dimethyl-1,3-propanediol, 1,4-dihydroxycyclohexane, 1,4-dimethylolcyclohexane, 1,8-octanediol, 1,10-decanediol, 1,12-dodecanediol, trimethylolpropane, glycerol or any desired mixtures thereof with one another.

The polyester polyols may also be based on natural raw materials, such as castor oil. It is also possible for the polyester polyols to be based on homo- or copolymers of lactones, as can preferably be obtained by an addition of lactones or lactone mixtures, such as butyrolactone, ε-caprolactone and/or methyl-ε-caprolactone, onto hydroxy-functional compounds, such as polyhydric alcohols having an OH functionality of ≥2, for example of the aforementioned type.

Such polyester polyols preferably have number-average molar masses of 400 to 4000 g/mol, more preferably of 500 to 2000 g/mol. Their OH functionality is preferably 1.5 to 3.5, more preferably 1.8 to 3.0.

Suitable polycarbonate polyols are obtainable in a manner known per se by reacting organic carbonates or phosgene with diols or diol mixtures.

Suitable organic carbonates are dimethyl, diethyl and diphenyl carbonate.

Suitable diols or mixtures comprise the polyhydric alcohols mentioned in the context of the polyester segments and having an OH functionality of >2, preferably 1,4-butanediol, 1,6-hexanediol and/or 3-methylpentanediol, or polyester polyols can also be converted into polycarbonate polyols.

Such polycarbonate polyols preferably have number-average molar masses of 400 to 4000 g/mol, more preferably of 500 to 2000 g/mol. The OH functionality of these polyols is preferably 1.8 to 3.2, more preferably 1.9 to 3.0.

Suitable polyether polyols are polyaddition products of cyclic ethers onto OH- or NH-functional starter molecules, said products optionally having a block structure.

Suitable cyclic ethers are, for example, styrene oxides, ethylene oxide, propylene oxide, tetrahydrofuran, butylene oxide, epichlorohydrin and any desired mixtures thereof.

The starters used may be the polyhydric alcohols mentioned in connection with the polyester polyols and having an OH functionality of ≥2, and also primary or secondary amines and amino alcohols.

Preferred polyether polyols are those of the aforementioned type based exclusively on propylene oxide or random or block copolymers based on propylene oxide with further 1-alkylene oxides, where the 1-alkylene oxide content is not higher than 80% by weight. Particular preference is given to propylene oxide homopolymers and random or block copolymers which have oxyethylene, oxypropylene and/or oxybutylene units, where the proportion of the oxypropylene units, based on the total proportion of all oxyethylene, oxypropylene and oxybutylene units, amounts to at least 20% by weight, preferably at least 45% by weight. Oxypropylene and oxybutylene here include all respective linear and branched C3 and C4 isomers.

Such polyether polyols preferably have number-average molar masses of 250 to 10 000 g/mol, more preferably of 500 to 8500 g/mol and most preferably of 600 to 4500 g/mol. The OH functionality is preferably 1.5 to 4.0, more preferably 1.8 to 3.1.

As specific polyether polyols, preference is given to using those formed from an isocyanate-reactive component comprising hydroxy-functional multiblock copolymers of the $Y(X_i\text{—}H)_n$ type where $i=1$ to 10 and $n=2$ to 8 and number-average molecular weights of greater than 1500 g/mol, the segments $X_i$ each being formed from oxyalkylene units of the formula I

where R is a hydrogen, alkyl or aryl radical which may also be substituted or interrupted by heteroatoms (such as ether oxygens), Y is the parent starter and the proportion of segments $X_i$ based on the total number of segments $X_i$ and Y is at least 50% by weight.

The outer blocks $X_i$ make up at least 50% by weight, preferably 66% by weight, of the total molar mass of $Y(X_i\text{—}H)_n$ and consist of monomer units which obey the formula I. Preferably, n in $Y(X_i\text{—}H)_n$ is a number from 2 to 6, more preferably 2 or 3 and most preferably 2. Preferably i in $Y(X_i\text{—}H)_n$ is a number from 1 to 6, more preferably from 1 to 3 and most preferably 1.

In formula I, R is preferably a hydrogen, a methyl, butyl, hexyl or octyl group, or an alkyl radical containing ether groups. Preferred alkyl radicals containing ether groups are those based on oxyalkylene units.

The multiblock copolymers $Y(X_i\text{—}H)_n$ preferably have number-average molecular weights of more than 1200 g/mol, more preferably more than 1950 g/mol, but preferably not more than 12 000 g/mol, more preferably not more than 8000 g/mol.

The blocks $X_i$ may be homopolymers of exclusively identical oxyalkylene repeat units. They may also be formed randomly from different oxyalkylene units or may themselves be formed blockwise from different oxyalkylene units.

Preferred, the segments $X_i$ are based exclusively on propylene oxide or random or blockwise mixtures of propylene oxide with further 1-alkylene oxides, where the proportion of further 1-alkylene oxides is not higher than 80% by weight.

Particularly preferred segments $X_i$ are propylene oxide homopolymers and random or block copolymers which oxyethylene and/or oxypropylene units, where the proportion of oxypropylene units based on the total amount of all oxyethylene and oxypropylene units is at least 20% by weight, preferably at least 40% by weight.

The blocks $X_i$ are, as described further down, added by ring-opening polymerization of the above-described alkylene oxides onto an n-tuply hydroxyl- or amino-functional starter block $Y(H)_n$.

The inner block Y, which is present in $Y(X_i\text{—}H)_n$ to an extent of less than 50% by weight, preferably of less than 34% by weight, consists of di-hydroxy-functional and/or higher hydroxy-functional polymer structures based on cyclic ethers, or is formed from di-hydroxy-functional and/or higher hydroxy-functional polycarbonate, polyester, poly(meth)acrylate, epoxy resin and/or polyurethane structural units, or corresponding hybrids.

Suitable polyester polyols are linear polyester diols or branched polyester polyols, as preparable in a known manner from aliphatic, cycloaliphatic or aromatic di- or polycarboxylic acids or anhydrides thereof, for example succinic acid, glutaric acid, adipic acid, pimelic acid, suberic acid, azelaic acid, sebacic acid, nonanedicarboxylic acid, decanedicarboxylic acid, terephthalic acid, isophthalic acid, o-phthalic acid, tetrahydrophthalic acid, hexahydrophthalic acid or trimellitic acid, and acid anhydrides such as o-phthalic anhydride, trimellitic anhydride or succinic anhydride, or any desired mixtures thereof with polyhydric alcohols, for example ethanediol, di-, tri- and tetraethylene glycol, 1,2-propanediol, di-, tri- and tetrapropylene glycol, propane-1,3- diol, butane-1,4-diol, butane-1,3-diol, butane-2,3-diol, pentane-1,5-diol, hexane-1,6-diol, 2,2-dimethylpropane-1,3-diol, 1,4-dihydroxycyclohexane, 1,4-dimethylolcyclohexane, octane-1,8-diol, decane-1,10-diol, dodecane-1,12-diol or mixtures thereof, optionally with additional use of higher-functionality polyols such as trimethylolpropane or glycerol. Useful polyhydric alcohols for preparation of the polyester polyols of course also include cycloaliphatic and/or aromatic di- and polyhydroxyl compounds. Instead of the free polycarboxylic acid, it is also possible to use the corresponding polycarboxylic anhydrides or corresponding polycarboxylic esters of lower alcohols or mixtures thereof to prepare the polyesters.

The polyester polyols may also be based on natural raw materials such as castor oil. It is likewise possible that the polyester polyols are based on homo- or copolymers of lactones, as preferably obtainable by addition of lactones or lactone mixtures such as butyrolactone, ε-caprolactone and/or methyl-ε-caprolactone onto hydroxy-functional compounds such as polyhydric alcohols of OH functionality of preferably 2, for example of the type mentioned above.

Such polyester polyols preferably have number-average molar masses of 200 to 2000 g/mol, more preferably of 400 to 1400 g/mol.

Suitable polycarbonate polyols are obtainable in a manner known per se by reaction of organic carbonates or phosgene with diols or diol mixtures.

Suitable organic carbonates are dimethyl carbonate, diethyl carbonate and diphenyl carbonate.

Suitable diols or mixtures include the polyhydric alcohols of OH functionality 2 mentioned in the context of the polyester polyols, preferably butane-1,4-diol, hexane-1,6-diol and/or 3-methylpentanediol. Polyester polyols can also be converted to polycarbonate polyols. In the conversion of the alcohols mentioned to polycarbonate polyols, particular preference is given to using dimethyl carbonate or diethyl carbonate.

Such polycarbonate polyols preferably have number-average molar masses of 400 to 2000 g/mol, more preferably of 500 to 1400 g/mol and most preferably of 650 to 1000 g/mol.

Suitable polyether polyols are polyaddition products, optionally of blockwise structure, of cyclic ethers onto OH- or NH-functional starter molecules. Examples of polyether polyols include the polyaddition products of the styrene oxides, of ethylene oxide, propylene oxide, tetrahydrofuran, butylene oxide, epichlorohydrin, and the mixed addition and grafting products thereof, and the polyether polyols obtained by condensation of polyhydric alcohols or mixtures thereof and those obtained by alkoxylation of polyhydric alcohols, and polyfunctional amines and amino alcohols.

Suitable polymers of cyclic ethers are especially polymers of tetrahydrofuran.

The starters used may be the polyhydric alcohols specified per se in the context of the polyester polyols, and also primary or secondary amines and amino alcohols of OH or NH functionality 2 to 8, preferably 2 to 6, more preferably 2 to 3, most preferably 2.

Such polyether polyols preferably have number-average molar masses of 200 to 2000 g/mol, more preferably of 400 to 1400 g/mol and most preferably of 650 to 1000 g/mol.

The polyether polyols used as starters are preferably the polymers of tetrahydrofuran.

It will be appreciated that it is also possible to use mixtures of the above-described components for the inner block Y.

Preferred components for the inner block Y are polymers of tetrahydrofuran and aliphatic polycarbonate polyols and polyester polyols, and polymers of ε-caprolactone having number-average molar masses less than 3100 g/mol.

Particularly preferred components for the inner block Y are difunctional polymers of tetrahydrofuran and difunctional aliphatic polycarbonate polyols and polyester polyols, and polymers of ε-caprolactone having number-average molar masses less than 3100 g/mol.

Most preferably, the starter segment Y is based on difunctional, aliphatic polycarbonate polyol, poly(ε-caprolactone) or polymers of tetrahydrofuran having number-average molar masses greater than 500 g/mol and less than 2100 g/mol.

Block copolymers of the $Y(X_i\text{---}H)_n$ structure used with preference consist to an extent of more than 50 percent by weight of the above as described blocks $X_i$ and have a number-average total molar mass of greater than 1200 g/mol.

Particularly preferred block copolyols consist to an extent of less than 50 percent by weight of aliphatic polyester, aliphatic polycarbonate polyol or poly THF, and to an extent of more than 50 percent by weight of the blocks $X_i$ described above as in accordance with the invention, and have a number-average molar mass of greater than 1200 g/mol. Particularly preferred block copolymers consist to an extent of less than 50 percent by weight of aliphatic polycarbonate polyol, poly(ε-caprolactone) or poly THF, and to an extent of more than 50 percent by weight of the blocks $X_i$ described above as in accordance with the invention, and have a number-average molar mass of greater than 1200 g/mol.

Very particularly preferred block copolymers consist to an extent of less than 34 percent by weight of aliphatic polycarbonate polyol, poly(ε-caprolactone) or poly THF, and to an extent of more than 66 percent by weight of the blocks $X_i$ described above as in accordance with the invention, and have a number-average molar mass of greater than 1950 g/mol and less than 9000 g/mol.

The block copolyols described are prepared by alkylene oxide addition methods.

The writing monomers B) used are one or more different compounds which have groups which, under the action of actinic radiation, undergo polymerization to crosslink with ethylenically unsaturated compounds (radiation-curing groups) and are themselves free of NCO groups. The writing monomers are preferably crosslinked acrylates and/or methacrylates. Very particular preference is given to crosslinked urethane acrylates and urethane (meth)acrylates.

In a further preferred embodiment, the writing monomer B) comprises at least one mono- and/or polyfunctional writing monomer, which may especially comprise mono- and polyfunctional acrylate writing monomers. The writing monomer may more preferably comprise at least one monofunctional and one polyfunctional urethane (meth)acrylate.

The acrylate writing monomers may especially be compounds of the general formula (II)

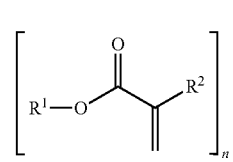

(II)

where in each case n is ≥1 and n≤4 and $R^1$ is a, linear, branched, cyclic or heterocyclic unsubstituted or else optionally heteroatom-substituted organic radical and/or $R^2$ is a, linear, branched, cyclic or heterocyclic unsubstituted or else optionally heteroatom-substituted organic radical. It is particularly preferable for R5 to be hydrogen or methyl and/or $R^1$ to be a linear, branched, cyclic or heterocyclic unsubstituted or else optionally heteroatom-substituted organic radical.

It is likewise possible that further unsaturated compounds such as $\alpha,\beta$-unsaturated carboxylic acid derivatives such as acrylates, methacrylates, maleates, fumarates, maleimides, acrylamides, and also vinyl ethers, propenyl ethers, allyl ethers and compounds containing dicyclopentadienyl units, and also olefinically unsaturated compounds, for example styrene, $\alpha$-methylstyrene, vinyltoluene, olefinines, for example 1-octene and/or 1-decene, vinyl esters, (meth)acrylonitrile, (meth)acrylamide, methacrylic acid, acrylic acid are added. Preference is given, however, to acrylates and methacrylates.

Acrylates and methacrylates refer generally to esters of acrylic acid and methacrylic acid respectively. Examples of useable acrylates and methacrylates are methyl acrylate, methyl methacrylate, ethyl acrylate, ethyl methacrylate, ethoxyethyl acrylate, ethoxyethyl methacrylate, n-butyl acrylate, n-butyl methacrylate, tert-butyl acrylate, tert-butyl methacrylate, hexyl acrylate, hexyl methacrylate, 2-ethylhexyl acrylate, 2-ethylhexyl methacrylate, butoxyethyl acrylate, butoxyethyl methacrylate, lauryl acrylate, lauryl methacrylate, isobornyl acrylate, isobornyl methacrylate, phenyl acrylate, phenyl methacrylate, p-chlorophenyl acrylate, p-chlorophenyl methacrylate, p-bromophenyl acrylate, p-bromophenyl methacrylate, 2,4,6-trichlorophenyl acrylate, 2,4,6-trichlorophenyl methacrylate, 2,4,6-tribromophenyl acrylate, 2,4,6-tribromophenyl methacrylate, pentachlorophenyl acrylate, pentachlorophenyl methacrylate, pentabromophenyl acrylate, pentabromophenyl methacrylate, pentabromobenzyl acrylate, pentabromobenzyl methacrylate, phenoxyethyl acrylate, phenoxyethyl methacrylate, phenoxyethoxyethyl acrylate, phenoxyethoxyethyl methacrylate, phenylthioethyl acrylate, phenylthioethyl methacrylate, 2-naphthyl acrylate, 2-naphthyl methacrylate, 1,4-bis(2-thionaphthyl)-2-butyl acrylate, 1,4-bis(2-thionaphthyl)-2-butyl methacrylate, propane-2,2-diylbis [(2,6-dibromo-4,1-phenylene)oxy(2-{[3,3,3-tris(4-chlorophenyl)propanoyl]oxy}propane-3,1-diyl)oxyethane-2,1-diyl]diacrylate, bisphenol A diacrylate, bisphenol A dimethacrylate, tetrabromobisphenol A diacrylate, tetrabromobisphenol A dimethacrylate and the ethoxylated analogue compounds thereof, N-carbazolylacrylates, to name just a selection of useable acrylates and methacrylates.

Urethane acrylates are understood to mean compounds having at least one acrylic ester group, which additionally possess at least one urethane bond. It is known that such compounds can be obtained by reaction of a hydroxy-functional acrylic ester with an isocyanate-functional compound.

Examples of isocyanate-functional compounds useable therefor are aromatic, araliphatic, aliphatic and cycloaliphatic di-, tri- or polyisocyanates. It is also possible to use mixtures of such di-, tri- or polyisocyanates. Examples of suitable di-, tri- or polyisocyanates are butylene diisocyanate, hexamethylene diisocyanate (HDI), isophorone diisocyanate (IPDI), 1,8-diisocyanato-4-(isocyanatomethyl)octane, 2,2,4- and/or 2,4,4-trimethylhexamethylene diisocyanate, the isomeric bis (4,4'-isocyanatocyclohexyl)methanes and mixtures thereof with any isomer content, isocyanatomethyl-1,8-octane diisocyanate, cyclohexylene 1,4-diisocyanate, the isomeric cyclohexanedimethylene diisocyanates, phenylene 1,4-diisocyanate, tolylene 2,4- and/or 2,6-diisocyanate, naphthylene 1,5-diisocyanate, diphenylmethane 2,4'- or 4,4'-diisocyanate, naphthylene 1,5-diisocyanate, m-methylthiophenyl isocyanate, triphenylmethane 4,4',4''-triisocyanate and tris(p-isocyanatophenyl) thiophosphate or derivatives thereof with urethane, urea, carbodiimide, acylurea, isocyanurate, allophanate, biuret, oxadiazinetrione, uretdione, iminooxadiazinedione structure, and mixtures thereof. Preference is given to aromatic or araliphatic di-, tri- or polyisocyanates.

Useful hydroxy-functional acrylates or methacrylates for the preparation of urethane acrylates include, for example, compounds such as 2-hydroxyethyl (meth)acrylate, polyethylene oxide mono(meth)acrylates, polypropylene oxide mono(meth)acrylates, polyalkylene oxide mono(meth)acrylates, poly($\epsilon$-caprolactone) mono(meth)acrylates, for example Tone® M100 (Dow, Schwalbach, Germany), 2-hydroxypropyl (meth)acrylate, 4-hydroxybutyl (meth)acrylate, 3-hydroxy-2,2-dimethylpropyl (meth)acrylate, hydroxypropyl (meth)acrylate, 2-hydroxy-3-phenoxypropyl acrylate, the hydroxy-functional mono-, di- or tetraacrylates of polyhydric alcohols such as trimethylolpropane, glycerol, pentaerythritol, dipentaerythritol, ethoxylated, propoxylated or alkoxylated trimethylolpropane, glycerol, pentaerythritol, dipentaerythritol or the technical mixtures thereof. Preference is given to 2-hydroxyethyl acrylate, hydroxypropyl acrylate, 4-hydroxybutyl acrylate and poly($\epsilon$-caprolactone) mono (meth)acrylates. Further suitable isocyanate-reactive are oligomeric or polymeric compounds containing unsaturated acrylate and/or methacrylate groups, alone or in combination with the aforementioned monomeric compounds. It is likewise possible to use the hydroxyl-containing epoxy (meth) acrylates which are known per se and have OH contents of 20 to 300 mg KOH/g or hydroxyl-containing polyurethane (meth)acrylates having OH contents of 20 to 300 mg KOH/g or acrylated polyacrylates having OH contents of 20 to 300 mg KOH/g, and mixtures thereof with one another and mixtures with hydroxyl-containing unsaturated polyesters and mixtures with polyester (meth)acrylates or mixtures of hydroxyl-containing unsaturated polyesters with polyester (meth)acrylates.

Preference is given especially to urethane acrylates obtainable from the reaction of tris(p-isocyanatophenyl) thiophosphate and m-methylthiophenyl isocyanate with alcohol-functional acrylates such as hydroxyethyl (meth)acrylate, hydroxypropyl (meth)acrylate and hydroxybutyl (meth)acrylate.

The photoinitiators C) used are typically compounds which can be activated by actinic radiation and can trigger polymerization of the corresponding groups.

The photoinitiators can be divided between unimolecular (type I) and bimolecular (type II) initiators. In addition, they are divided according to their chemical nature into photoinitiators for the free-radical, anionic, cationic or mixed type of polymerization.

Type I photoinitiators (Norrish type I) for free-radical photopolymerization form free radicals on irradiation through unimolecular bond fission.

Examples of type I photoinitiators are triazines, for example tris(trichloromethyl)triazine, oximes, benzoin ethers, benzil ketals, alpha,alpha-dialkoxyacetophenone, phenylglyoxylic esters, bisimidazoles, aroylphosphine oxides, e.g. 2,4,6-trimethylbenzoyldiphenylphosphine oxide, sulphonium salts and iodonium salts.

Type II photoinitiators (Norrish type II) for free-radical polymerization undergo a bimolecular reaction on irradiation, the photoinitiator in the excited state reacting with a second molecule, the coinitiator, and forming the polymerization-triggering free radicals by electron or proton transfer or direct hydrogen abstraction.

Examples of type II photoinitiators are quinones, for example camphorquinone, aromatic keto compounds, for example benzophenones in combination with tertiary amines, alkylbenzophenones, halogenated benzophenones, 4,4'-bis(dimethylamino)benzophenone (Michler's ketone), anthrone, methyl p-(dimethylamino)benzoate, thioxanthone, ketocoumarins, alpha-aminoalkylphenone, alpha-hydroxy-alkylphenone and cationic dyes, for example methylene blue, in combination with tertiary amines.

For the UV and short-wave visible range, type I and type II photoinitiators are used; for the longer-wave visible range, predominantly type II photoinitiators are used.

It is also possible to use the photoinitiator systems described in EP 0 223 587 A, consisting of a mixture of an ammonium alkylarylborate and one or more dyes, as a type II photoinitiator for free-radical polymerization. Examples of suitable ammonium alkylarylborates include tetrabutylammonium triphenylhexylborate, tetrabutylammonium triphenylbutylborate, tetrabutylammonium trinaphthylhexylborate, tetrabutylammonium tris(4-tert-butyl)phenylbutylborate, tetrabutylammonium tris(3-fluorophenyl)hexylborate, tetramethylammonium triphenylbenzylborate, tetra(n-hexyl)ammonium (sec-butyl)triphenylborate, 1-methyl-3-octylimidazolium dipentyldiphenylborate and tetrabutylammonium tris(3-chloro-4-methylphenyl)hexylborate (Cunningham et al., RadTech'98 North America UV/EB Conference Proceedings, Chicago, Apr. 19-22, 1998).

The photoinitiators used for the anionic polymerization are generally type I systems and derive from transition metal complexes of the first series. Examples here include chromium salts, for example trans-$Cr(NH_3)_2(NCS)_4^-$ (Kutal et al, Macromolecules 1991, 24, 6872) or ferrocenyl compounds (Yamaguchi et al. Macromolecules 2000, 33, 1152).

A further means of anionic polymerization involves the use of dyes such as crystal violet leuconitrile or malachite green leuconitrile, which can polymerize cyanoacrylates through photolytic decomposition (Neckers et al. Macromolecules 2000, 33, 7761). The chromophore is incorporated into the polymers, and so the resulting polymers are coloured.

The photoinitiators useable for the cationic polymerization consist essentially of three classes: aryldiazonium salts, onium salts (here specifically: iodonium, sulphonium and selenonium salts) and organometallic compounds. Phenyldiazonium salts, when irradiated either in the presence or in the absence of a hydrogen donor, can generate a cation which initiates the polymerization. The efficiency of the overall system is determined by the nature of the counterion to the diazonium compound used. Preference is given here to the relatively unreactive but quite expensive $SbF_6^-$, $AsF_6^-$ or $PF_6^-$. These compounds are generally not very suitable for use in coating of thin films, since the nitrogen released after the exposure lowers the surface quality (pinholes) (Li et al., Polymeric Materials Science and Engineering, 2001, 84, 139).

Very widespread, and also commercially available in many forms, are onium salts, specifically sulphonium and iodonium salts. The photochemistry of these compounds has been studied extensively. After excitation, the iodonium salts at first decompose homolytically and thus form a free radical and a free radical cation, which is at first converted by hydrogen abstraction to a cation, which ultimately releases a proton and thus initiates the cationic polymerization (Dektar et al. J. Org. Chem. 1990, 55, 639; J. Org. Chem., 1991, 56. 1838). This mechanism enables the use of iodonium salts likewise for free-radical photopolymerization. In this context, the choice of counterion is again of great significance. Preference is likewise given to using $SbF_6^-$, $AsF_6^-$ or $PF_6^-$. Otherwise, within this structural class, the choice of substitution of the aromatic system is quite open and is determined essentially by the availability of suitable starting materials for the synthesis. The sulphonium salts are compounds which decompose according to Norrish type II (Crivello et al., Macromolecules, 2000, 33, 825). In the case of the sulphonium salts too, the choice of counterion is of critical significance, this being manifested essentially in the curing rate of the polymers. The best results are generally achieved with $SbF_6^-$ salts.

Since the intrinsic absorption of iodonium and sulphonium salts is at <300 nm, these compounds, for the photopolymerization, should be correspondingly sensitized with near UV or short-wave visible light. This is possible through the use of aromatic systems with relatively long-wave absorption, for example anthracene and derivatives (Gu et al., Am. Chem. Soc. Polymer Preprints, 2000, 41 (2), 1266) or phenothiazine or derivatives thereof (Hua et al, Macromolecules 2001, 34, 2488-2494).

It may be advantageous to use mixtures of these sensitizers or else photoinitiators. According to the radiation source used, the type and concentration of photoinitiator has to be adjusted in a manner known to those skilled in the art. Further descriptions are given, for example, in P. K. T. Oldring (Ed.), Chemistry & Technology of UV & EB Formulations For Coatings, Inks & Paints, Vol. 3, 1991, SITA Technology, London, p. 61-328.

Preferred photoinitiators are mixtures of tetrabutylammonium tetrahexylborate, tetrabutylammonium triphenylhexylborate, tetrabutylammonium triphenylbutylborate, tetrabutylammonium tris(3-fluorophenyl)hexylborate ([191726-69-9], CGI 7460, product from BASF SE, Basle, Switzerland) and tetrabutylammonium tris(3-chloro-4-methylphenyl)hexylborate ([1147315-11-4], CGI 909, product from BASF SE, Basle, Switzerland) with cationic dyes as described, for example, in H. Berneth in Ullmann's Encyclopedia of Industrial Chemistry, Cationic Dyes, Wiley-VCH Verlag, 2008.

Examples of cationic dyes are Astrazon Orange G, Basic Blue 3, Basic Orange 22, Basic Red 13, Basic Violet 7, Methylene Blue, New Methylene Blue, Azure A, Pyrillium I, Safranin O, Cyanine, Gallocyanine, Brilliant Green, Crystal Violet, Ethyl Violet and Thionine.

It is especially preferable when the photopolymer layer comprises a cationic dye of the formula $F^+An^-$.

Cationic dyes of the formula $F^+$ are preferably understood to mean those from the following classes: acridine dyes, xanthene dyes, thioxanthene dyes, phenazine dyes, phenoxazine dyes, phenothiazine dyes, tri(het)arylmethane dyes, especially diamino- and triamino(het)arylmethane dyes, mono-, di- and trimethinecyanine dyes, hemicyanine dyes, externally cationic merocyanine dyes, externally cationic neutrocyanine dyes, zero methine dyes, especially naphtholactam dyes, streptocyanine dyes. Such dyes are described, for example, in H. Berneth in Ullmann's Encyclopedia of Industrial Chemistry, Azine Dyes, Wiley-VCH Verlag, 2008, H. Berneth in Ullmann's Encyclopedia of Industrial Chemistry, Methine Dyes and Pigments, Wiley-VCH Verlag, 2008, T. Gessner, U. Mayer in Ullmann's Encyclopedia of Industrial Chemistry, Triarylmethane and Diarylmethane Dyes, Wiley-VCH Verlag, 2000.

$An^-$ means an anion. Preferred anions $An^-$ are especially $C_8$- to $C_{25}$-alkanesulphonate, preferably $C_{13}$- to $C_{25}$-alkanesulphonate, $C_3$- to $C_{18}$-perfluoroalkanesulphonate, $C_4$- to $C_{18}$-perfluoroalkanesulphonate bearing at least 3 hydrogen atoms in the alkyl chain, $C_9$- to $C_{25}$-alkanoate, $C_9$- to $C_{25}$-alkenoate, $C_8$- to $C_{25}$-alkylsulphate, preferably $C_{13}$- to $C_{25}$-alkylsulphate, $C_8$- to $C_{25}$-alkenylsulphate, preferably $C_{13}$- to $C_{25}$-alkenylsulphate, $C_3$- to $C_{18}$-perfluoroalkylsulphate, $C_4$- to $C_{18}$-perfluoroalkylsulphate bearing at least 3 hydrogen atoms in the alkyl chain, polyether sulphates based on at least 4 equivalents of ethylene oxide and/or equivalents 4 propylene oxide, bis-$C_4$- to -$C_{25}$-alkyl, —$C_5$- to —$C_7$-cycloalkyl, —$C_3$- to —$C_8$-alkenyl or —$C_7$- to —$C_{11}$-aralkyl sulphosuccinate, bis-$C_2$- to -$C_{10}$-alkyl sulphosuccinate substituted by at least 8 fluorine atoms, $C_8$- to $C_{25}$-alkyl sulphoacetates, benzenesulphonate substituted by at least one radical from the group of halogen, $C_4$- to $C_{25}$-alkyl, perfluoro-$C_1$- to -$C_8$-alkyl and/or $C_1$- to $C_{12}$-alkoxycarbonyl, naphthalene- or biphenylsulphonate optionally substituted by nitro, cyano, hydroxyl, $C_1$- to $C_{25}$-alkyl, $C_1$- to $C_{12}$-alkoxy, amino, $C_1$- to $C_{12}$-alkoxycarbonyl or chlorine, benzene-, naphthalene- or biphenyldisulphonate optionally substituted by nitro, cyano, hydroxyl, $C_1$- to $C_{25}$-alkyl, $C_1$- to $C_{12}$-alkoxy, $C_1$- to $C_{12}$-alkoxycarbonyl or chlorine, benzoate substituted by dinitro, $C_6$- to $C_{25}$-alkyl, $C_4$- to $C_{12}$-alkoxycarbonyl, benzoyl, chlorobenzoyl or tolyl, the anion of naphthalenedicarboxylic acid, diphenyl ether disulphonate, sulphonated or sulphated, optionally at least monounsaturated $C_8$ to $C_{25}$ fatty acid esters of aliphatic $C_1$- to $C_8$-alcohols or glycerol, bis(sulpho-$C_2$- to -$C_6$-alkyl)-$C_3$- to -$C_{1-2}$-alkanedicarboxylic esters, bis(sulpho-$C_2$- to -$C_6$-alkyl)itaconic esters, (sulpho-$C_2$- to -$C_6$-alkyl)-$C_6$- to -$C_{18}$-alkanecarboxylic esters, (sulpho-$C_2$- to -$C_6$-alkyl)acrylic or methacrylic esters, triscatechol phosphate optionally substituted by up to 12 halogen radicals, an anion from the group of tetraphenylborate, cyanotriphenylborate, tetraphenoxyborate, $C_4$- to $C_{12}$-alkyltriphenylborate whose phenyl or phenoxy radicals may be substituted by halogen, $C_1$- to $C_4$-alkyl and/or $C_1$- to $C_4$-alkoxy, $C_4$- to $C_{12}$-alkyltri-naphthylborate, tetra-$C_1$- to -$C_{20}$-alkoxyborate, 7,8- or 7,9-dicarbanidoundecaborate(1-) or (2-) optionally substituted on the boron and/or carbon atoms by one or two $C_1$- to $C_{12}$-alkyl or phenyl groups, dodecahydrodicarbadodecaborate(2-) or B—$C_1$- to —$C_{12}$-alkyl-C-phenyldodecahydrodicarbadodecaborate(1-), where $An^-$ in the case of polyvalent anions such as naphthalenedisulphonate represents one equivalent of this anion, and where the alkane and alkyl groups may be branched and/or may be substituted by halogen, cyano, methoxy, ethoxy, methoxycarbonyl or ethoxycarbonyl.

Particularly preferred anions are sec-$C_{11}$- to -$C_{18}$-alkanesulphonate, $C_{13}$- to -$C_{25}$-alkylsulphate, branched $C_8$- to $C_{25}$-alkylsulphate, optionally branched bis-$C_6$- to -$C_{25}$-alkylsulphosuccinate, sec- or tert-$C_4$- to -$C_{25}$-alkylbenzenesulphonate, sulphonated or sulphated, optionally at least monounsaturated $C_8$- to $C_{25}$-fatty acid esters of aliphatic $C_1$- to $C_8$-alcohols or glycerol, bis(sulpho-$C_2$- to -$C_6$-alkyl)-$C_3$- to -$C_{12}$-alkanedicarboxylic esters, (sulpho-$C_2$- to -$C_6$-alkyl)-$C_6$- to -$C_{18}$-alkanecarboxylic esters, triscatecholphosphate substituted by up to 12 halogen radicals, cyanotriphenylborate, tetraphenoxyborate, butyltriphenylborate.

It is also preferable when the anion $An^-$ of the dye has an AC log P in the range of 1-30, more preferably in the range of 1-12 and especially preferably in the range of 1-6.5. The AC log P is calculated according to J. Comput. Aid. Mol. Des. 2005, 19, 453; Virtual Computational Chemistry Laboratory, http://www.vcclab.org.

Particular preference is given to dyes $F^+An^-$ having a water absorption of ≤5% by weight.

The water absorption is calculated from the formula (F-1)

$$W=(m_f/m_t-1)*100\%  \quad \text{(F-1)}$$

in which $m_f$ is the mass of the dye after water saturation and $m_t$ is the mass of the dried dye. $m_t$ is determined by drying a particular amount of dye to constant mass, for example at elevated temperature under reduced pressure. $m_f$ is determined by leaving a particular amount of dye to stand under air at a defined air humidity to constant weight.

It is most preferable when the photoinitiator comprises a combination of dyes whose absorption spectra at least partly cover the spectral range from 400 to 800 nm, with at least one coinitiator matched to the dyes.

The catalyst D) may comprise at least one compound of the general formula (III) or (IV)

$$R^3Sn(IV)L_3 \quad \text{(III)}$$

$$L_2Sn(IV)R^3_2 \quad \text{(IV)}$$

in which $R^3$ is a linear or branched alkyl radical which is optionally substituted by heteroatoms, especially by oxygen, including in the chain, and has 1-30 carbon atoms, and L are each independently $^-O_2C$—$R^4$ groups in which $R^4$ is a linear or branched alkyl radical which is optionally substituted by heteroatoms, especially by oxygen, including in the chain, and has 1-30 carbon atoms, an alkenyl radical having 2-30 carbon atoms or any substituted or unsubstituted, optionally polycyclic aromatic ring with or without heteroatoms.

It is especially preferable here when $R^3$ is a linear or branched alkyl radical having 1-12 carbon atoms, more preferably a methyl, ethyl, propyl, n-, i-, t-butyl, n-octyl radical and most preferably an n-, i-, t-butyl radical, and/or $R^4$ is a linear or branched alkyl radical which is optionally substituted by heteroatoms, especially by oxygen, including in the chain, and has 1-17 carbon atoms, or an alkenyl radical having 2-17 carbon atoms, more preferably a linear or branched alkyl or alkenyl radical having 3-13 carbon atoms, most preferably a linear or branched alkyl or alkenyl radical having 5-11 carbon atoms. More particularly, all L are the same.

Further suitable catalysts are, for example, compounds of the general formula (V) or (VI)

$$Bi(III)M_3 \quad \text{(V)}$$

$$Sn(II)M_2 \quad \text{(VI)}$$

in which M are each independently $^-O_2C$—$R^5$ groups in which $R^5$ is a saturated or unsaturated or heteroatom-substituted $C_1$- to $C_{19}$-alkyl radical or $C_2$- to $C_{19}$-alkenyl radical, especially a $C_6$- to $C_{11}$-alkyl radical and more preferably a $C_7$- to $C_9$-alkyl radical, or an optionally aromatic or arbitrarily oxygen- or nitrogen-substituted $C_1$- to $C_{18}$-alkyl radical, where M in the formulae (V) and (VI) need not be the same.

It is especially preferable when the catalyst D) is selected from the group of the abovementioned compounds of the formulae (III) and/or (IV).

Further constituents of the photopolymer layer may be: free-radical stabilizers or other assistants and additives.

In a further embodiment, the photopolymer layer additionally comprises additives and more preferably urethanes as additives, where the urethanes may especially be substituted by at least one fluorine atom.

The additives may preferably have the general formula (VII)

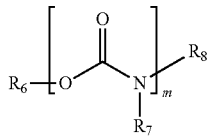

where m is ≥1 and ≤8 and R6, R7, R8 are linear, branched, cyclic or heterocyclic unsubstituted or optionally heteroatom-substituted organic radicals, and/or R7, R8 are independently hydrogen, wherein preferably at least one of R6, R7, R8 is substituted with at least a fluorine atom and more preferably R6 is an organic radical comprising at least one fluorine atom. It is particularly preferable for R7 to be a linear, branched, cyclic or heterocyclic organic radical which is unsubstituted or optionally substituted even with heteroatoms such as fluorine for example.

Description of the Radiation-Curing Resin

The radiation-curing resin I) may preferably comprise at least one polyester-, polyether-, polycarbonate- and/or polyurethane-containing binder having free-radically polymerizable groups, the free-radically polymerizable groups preferably being acryloyl, methacryloyl, allyl, vinyl, maleyl and/or fumaryl groups, more preferably acryloyl and/or methacryloyl groups and most preferably acryloyl groups. (Meth)acryloyl-containing binders are generally prepared by means of esterification of (meth)acrylic acid with polyols (see, for example, DE000019834360A1, EP000000900778B1) or with polyalkoxylated polyols according to DE102007037140A1. According to the chemical groups present in the polyols, reference is made to polyester acrylates, polyether acrylates or polycarbonate acrylates. If several group types are present, reference is also made, for example, to polyether/ester acrylates.

It is likewise also possible to precrosslink (meth)acryloyl-containing binders with di- or polyisocyanates to give higher molecular weight resins, as a result of which urethane groups are additionally introduced. Such resins are called urethane acrylates. If aliphatic isocyanates are used, these products are also called aliphatic urethane acrylates. If aromatic isocyanates are used, these products are also called aromatic urethane acrylates. Urethane acrylates are likewise understood to mean adducts of di- and polyisocyanates and hydroxyl groups functional acrylic esters (for example hydroxyethyl, hydroxypropyl and hydroxybutyl acrylate), as described inter alia in DE19944156A1 and DE 10143630A1.

Advantageous low-viscosity urethane acrylates which additionally contain allophanate groups can also be used. These are made available under specific catalysis from isocyanates and urethane acrylates prepared as intermediates according to, inter alia, DE102004048873A1 and DE102009008569A1, and are likewise of good suitability.

Further useable binders are epoxy acrylates which can be prepared by reaction of epoxy resins with acrylic acid. Epoxy resins are reaction products of low molecular weight diepoxides as obtainable, inter alia, from bisphenol A and epichlorohydrin in various blend ratios. Other epoxy acrylates based on other aliphatic or aromatic alcohols/phenols with epichlorohydrin and subsequent reaction with acrylic acid are likewise useable.

It is preferable when the radiation-curing resin I) comprises at least one compound from the group of the polyether acrylates, polyester acrylates, aliphatic urethane acrylates, aromatic urethane acrylates and epoxy acrylates, and preferably at least one aliphatic urethane acrylate and/or at least one aromatic urethane acrylate.

In a further preferred embodiment of the invention, the radiation-curing resin I) contains ≤4% by weight of compounds having a weight-average molecular weight of <500 and ≥77% by weight of compounds having a weight-average molecular weight of >1000 and preferably ≤3.5% by weight of compounds having a weight-average molecular weight of <500 and ≥79% by weight of compounds having a weight-average molecular weight of >1000. It is likewise also possible to use blends of different radiation-curing resins I). For these mixtures, the abovementioned suitable weight-average molecular weight proportions apply analogously and relate to the averaged weight-average molecular weight proportions of these mixtures.

In the radiation-curing layer, preferably to at least 85% by weight of one or more radiation-curing resins I) are used.

Description of the Isocyanate-Functional Resin II)

The isocyanate-functional resin II) may comprise at least one aliphatic, araliphatic or aromatic isocyanate-containing binder. It is especially preferable when the isocyanate-containing binder is an isocyanate-functional prepolymer which is preferably obtainable by reaction of a polyfunctional alcohol with an excess of diisocyanate. Suitable prepolymers are especially those preparable by reaction of difunctional or higher-functionality alcohols and diisocyanates with an excess of diisocyanate. DE 10 2009 037 009 A1 and DE 10 2009 010 069 A1 describe typical formation components and process steps for preparation of particularly suitable isocyanate-functional resins.

In addition, it is also possible to use isocyanate-functional resins which additionally have (meth)acrylate groups. Typically, such products are prepared by reaction of isocyanate-functional prepolymers or of polyisocyanates with a hydroxy-functional (meth)acrylate such as hydroxyethyl, hydroxypropyl and hydroxybutyl (meth)acrylate in a stoichiometric excess (NCO:OH>1). Polyisocyanates are reaction products of diisocyanates, such as hexamethylene diisocyanate (HDI), xylylene diisocyanate (XDI), isophorone diisocyanate (IPDI), methylene diisocyanate (MDI), the isomeric bis(isocyanatocyclohexyl)methane (H12-MDI), tolylidene diisocyanate (TDI) and other industrially available diisocyanates to give isocyanurate, biuret, iminooxadiazinetrione, uretdione, allophanate or cooligomer mixtures thereof.

Likewise suitable are reaction products of prepolymers based on the polyisocyanates with diols and hydroxy-functional (meth)acrylate such as hydroxyethyl, hydroxypropyl and hydroxybutyl (meth)acrylate in a stoichiometric excess (NCO:OH>1). The diols used here are simple diols such as ethylene glycol, propylene glycol, butanediol, hexanediol, (iso)octanediols, diethylene glycol, triethylene glycol, neopentyl glycol or adducts thereof with ethylene oxide and/or propylene oxide to give oligoethers, adducts thereof with ε-caprolactone to give oligoesters, or polycondensation with diacids such as adipic acid, maleic acid, phthalic acid, isophthalic acid, terephthalic acid and the like to give oligoesters.

It is also preferable when the isocyanate-functional resin II) contains ≤4% by weight and more preferably ≤3% by weight of compounds having a weight-average molecular weight of <500.

It is likewise also possible to use blends of various isocyanate-functional resins II). For these mixtures, the abovementioned suitable weight-average molecular weight proportions then apply analogously and are based on the averaged weight-average molecular weight proportions of these mixtures.

It is also advantageous when the protective layer contains ≥3% by weight and ≤15% by weight, preferably ≥5% by weight and ≤15% by weight and more preferably ≥8% by weight and ≤12% by weight of the isocyanate-functional resin II).

Description of the Photoinitiator System III)

The photoinitiator system III) comprises initiators which can trigger a free-radical polymerization after irradiation with high-energy radiation, for example UV light. Such photoinitiators are described, for example, in P. K. T. Oldring (Ed.), Chemistry & Technology of UV & EB Formulations For Coatings, Inks & Paints, Vol. 3, 1991, SITA Technology, London, p. 61-325. The photoinitiator system III) may preferably comprise at least one compound from the group of 2-hydroxyphenyl ketones, especially 1-hydroxycyclohexyl phenyl ketone, benzil ketals, especially benzil dimethyl ketal, acylphosphine oxides, especially bis(2,4,6-trimethylbenzoyl)phenylphosphine oxide, diacylphosphine oxides, benzophenone and derivatives thereof. They can be used alone or in a mixture, optionally also together with further accelerators or coinitiators, as an additive calculated on the basis of solids in the coating system, in amounts of 0.1 to 10% by weight, preferably 2 to 7% by weight and more preferably 2.5 to 5% by weight.

In addition, the protective layer may comprise further additives which are also used in addition according to the method of application: levelling aids (e.g. polyacrylates, silicones, hybrid materials), antistatic agents; fillers (e.g. sodium carbonate, calcium carbonate), antiblocking agents (silica), light stabilizers (e.g. UV absorbers, HALS amines, phosphonates), pigments and dyes.

The Production of the Inventive Laminate Structure

The invention further provides a process for producing an inventive laminate structure, in which a mixture at least comprising the radiation-curing resin I), the isocyanate-functional resin II) and the photoinitiator system III) is applied to the exposed photopolymer layer and cured.

The application is effected by means of customary techniques for applying liquids to the hologram-containing photopolymer layer. Customary processes are two-dimensional, continuous applying techniques such as the coating bar methods known to those skilled in the art (such as doctor blade, knife-over-roll coater, comma bar, floating knifecoater, rubber blanket coater, inter alia), die systems (e.g. slot die), curtain coater, roll application processes (patterned rollers, reverse roll coater), dipping methods, screen printing or screen application.

If the protective layer is used as a direct seal for the photopolymer layer, the application is followed by radiative curing by means of UV radiation. For this purpose, high-pressure vapour lamps are used, which can be adjusted with different metal lamp dopants to match the emission spectra thereof to the photoinitiator system III) used. It may be advantageous to keep the thermal radiation of the UV high-pressure vapour lamps away from the radiation-curing layer by means of dichroitic reflectors or the like.

The inventive laminate structure is likewise suitable, for example, for use in labels or stickers. In these applications, a (pressure-sensitive) adhesive is used for bonding of the labels or stickers. Customary pressure-sensitive adhesives are polyacrylate adhesives, which generally lead to significant hologram discoloration.

The inventive laminate structure can thus avoid the direct influence of the (pressure-sensitive) adhesive on the hologram, by positioning of the protective layer between hologram-containing photopolymer layer and (pressure-sensitive) adhesive. The (pressure-sensitive) adhesive is applied by means of liquid application methods or by means of an adhesive layer transfer method to the protective layer.

The adhesive layer transfer method is especially suitable when no liquid chemicals are to be handled in the course of production of the labels or stickers, or when the layer thickness of the (pressure-sensitive) adhesive layer is to be set precisely. In this case, in a preceding step, the (pressure-sensitive) adhesive layer is applied to a redetachable substrate and optionally protected with a further detachable lamination film. In the adhesive layer transfer method, the lamination film is then pulled off and the (pressure-sensitive) adhesive is laminated directly onto the protective layer. Usually, the substrate of the (pressure-sensitive) adhesive remains as a transfer substrate until the label/the sticker is applied. It is possible to dispense with the lamination film when the reverse of the transfer substrate is likewise rendered antiadhesive.

According to the adhesive type, it may be advantageous to conduct the UV radiation curing of the protective layer before or after the application of the (pressure-sensitive) adhesive. It is preferable to conduct the curing prior to the application of the (pressure-sensitive) adhesive. Likewise preferable is application by means of a transfer adhesive film.

For the use of a multilayer structure composed of photopolymer layer and protective layer and further layers in a label, in a security card, in a banknote, in a printed article, in an optical structure, in an electronic display etc., it may be advantageous to use the protective layer directly as a bonding solution for the photopolymer layer. This is especially true of substrates composed of paper, thermoplastics, thermosets, metals, glass, wood, painted, coated, laminated or printed substrates, etc. It may be advantageous in this case to pretreat the substrates. Examples thereof are chemical pretreatment with solvents, for precleaning such as degreasing, physical pretreatment such as plasma treatment or corona treatment, radiative activation, deposition or application of adhesion-promoting layers. The UV radiative curing of the protective layer is conducted after application to such substrates. The application is effected either by wet application of the formulation of the protective layer to the photopolymer and subsequent direct lamination of the substrate, or by wet application of the formulation of the protective layer to the substrate and subsequent direct lamination of the photopolymer, or by simultaneous application, for example in a laminator. In the case of thick layers, which are thus not UV-transparent or are even non-transparent, it may be advantageous to use other high-energy radiation, such as electron beams or x-radiation, to cure the protective layer.

In a further preferred embodiment of the invention, a hologram may be incorporated by exposure into the photopolymer layer. The holograms may be any holographic volume holograms which have been recorded by methods known to those skilled in the art. These include multicolour or full-colour reflection holograms which have been exposed monochromatically or produced with a plurality of lasers of different emission wavelength, in-line (Gabor) holograms, off-axis holograms, full-aperture transfer holograms, white light transmission holograms ("rainbow holograms"), Lippmann holograms, Denisyuk holograms, off-axis reflection holograms, edge-lit holograms and holographic stereograms.

Possible optical functions of the holograms correspond to the optical functions of light elements such as lenses, mirrors, deflecting mirrors, filters, diffuser lenses (with and without a restricted eye box)), diffraction elements, light guides, waveguides, projection lenses, masks, optical prisms for spectral chromatic splitting, light directing and light guiding, and also light shaping. These optical elements frequently have a frequency selectivity according to how the holograms have been exposed and the dimensions of the hologram.

In addition, by means of the inventive laminate structures, it is also possible to produce holographic images or representations, for example for personal portraits, biometric representations in security documents, or generally of images or image structures for advertising, security labels, brand protection, branding, labels, design elements, decorations, illustrations, collectable cards, images and the like, and also images which can represent digital data, including in combination with the products detailed above. Holographic images can have the impression of a three-dimensional image, but they may also represent image sequences, short films or a number of different objects according to the angle from which, the light source with which (including moving light sources) etc. it is illuminated. Due to this variety of possible designs, holograms, especially volume holograms, constitute an attractive technical solution for the abovementioned application.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

The invention is illustrated in detail hereinafter with reference to examples.

Raw Materials:

Desmodur® N 3900 is a commercial product from Bayer MaterialScience AG, Leverkusen, Germany, hexane diisocyanate-based polyisocyanate, proportion of iminooxadiazinedione at least 30%, NCO content: 23.5%.

Polyol 1 is an experimental product from Bayer MaterialScience AG, Leverkusen, Germany; the preparation method is described below.

Writing monomer 1 is an experimental product from Bayer MaterialScience AG, Leverkusen, Germany; the preparation is described below.

Writing monomer 2 is an experimental product from Bayer MaterialScience AG, Leverkusen, Germany; the preparation is described below.

Additive 1 is an experimental product from Bayer MaterialScience AG, Leverkusen, Germany; the preparation is described below.

Dyes 1-3: are experimental products from Bayer MaterialScience AG, Leverkusen, Germany; the preparation thereof is described below.

Coinitiator 1: tetrabutylammonium tris(3-chloro-4-methylphenyl)hexylborate (available as CGI 909, product from BASF SE, Basle, Switzerland).

Byk® 310 (silicone-based surface additive from BYK-Chemie GmbH, Wesel, 25% solution in xylene).

Resin 1: Desmolux U 200 is a commercial product from Bayer MaterialScience AG, Leverkusen, a hard but flexible aliphatic urethane acrylate in 100% supply form with a typical viscosity of 9000 mPas/23° C.

Resin 2: Desmolux U 100 is a commercial product from Bayer MaterialScience AG, Leverkusen, a hard but flexible aliphatic urethane acrylate in 100% supply form with a typical viscosity of 7500 mPas/23° C.

Resin 3: Desmolux U 500 is a commercial product from Bayer MaterialScience AG, Leverkusen, a hard, flexible aromatic urethane acrylate in 100% supply form with a typical viscosity of 6000 mPas/23° C.

Resin 4: Desmolux XP 2513 is an experimental product from Bayer MaterialScience AG, Leverkusen, a flexible aliphatic urethane acrylate in 100% supply form with a typical viscosity of 25 000 mPas/23° C.

Resin 5: Desmolux XP 2738 is an experimental product from Bayer MaterialScience AG, Leverkusen, a hard, aliphatic allophanate-based urethane acrylate in 100% supply form with a typical viscosity of 30 000 mPas/23° C.

Resin 6: Desmolux XP 2739 is an experimental product from Bayer MaterialScience AG, Leverkusen, a highly reactive, hard, aliphatic allophanate-based urethane acrylate in 100% supply form with a typical viscosity of 20 000 mPas/23° C.

Resin 7: Desmolux XP 2732 is an experimental product from Bayer MaterialScience AG, Leverkusen, a hard, high-functionality polyester acrylate in 100% supply form with a typical viscosity of 2500 mPas/23° C.

Resin 8: Desmolux XP 2744 is an experimental product from Bayer MaterialScience AG, Leverkusen, a hard but flexible polyester acrylate in 100% supply form with a typical viscosity of 5500 mPas/23° C.

Resin 9: Desmolux XP 2666 is an experimental product from Bayer MaterialScience AG, Leverkusen, a hard, aliphatic allophanate-based urethane acrylate in 100% supply form with a typical viscosity of 60 000 mPas/23° C.

Resin 10: Desmolux XP 2733 is a commercial product from Bayer MaterialScience AG, Leverkusen, a hard but flexible polyester acrylate in 100% supply form with a typical viscosity of 18 000 mPas/23° C.

Resin 11: Desmolux U 400 is a commercial product from Bayer MaterialScience AG, Leverkusen, a hard, aliphatic urethane (hexa)acrylate in 60% supply form in PTTA with a typical viscosity of 90 000 mPas/23° C.

Resin 12: Desmolux U 680 H is a commercial product from Bayer MaterialScience AG, Leverkusen, a hard, aliphatic urethane (hexa)acrylate in 80% supply form in hexanediol diacrylate with a typical viscosity of 29 000 mPas/23° C.

Resin 13: Desmolux XP 2299 is an experimental product from Bayer MaterialScience AG, Leverkusen, a moderately hard, amine-modified polyether acrylate in 100% supply form with a typical viscosity of 600 mPas/23° C.

Resin 14: Desmolux U 375 H is a commercial product from Bayer MaterialScience AG, Leverkusen, a hard but flexible, aliphatic urethane (hexa)acrylate in 75% supply form in hexanediol diacrylate with a typical viscosity of 60 000 mPas/23° C.

Resin 15: Desmolux XP 2266 is a commercial product from Bayer MaterialScience AG, Leverkusen, a hard but flexible ester epoxy acrylate in 100% supply form with a typical viscosity of 6500 mPas/23° C.

Resin A: Desmolux VP LS 2396 is an experimental product from Bayer MaterialScience AG, Leverkusen, a flexible, aliphatic urethane acrylate containing isocyanate groups in 100% supply form with a typical viscosity of 16 000 mPas/23° C. and an NCO content of 7.5%. According to GPC analysis, the resin contains 0.88% by weight of components having a weight-average molecular weight of <500.

Resin B: Desmolux XP 2617 is an experimental product from Bayer MaterialScience AG, Leverkusen, a hexamethylene diisocyanate-based aliphatic polyisocyanate prepolymer in 100% supply form with a typical viscosity of 3000-5500 mPas/23° C. and an NCO content of 12.0-13.0%. According to GPC analysis, the resin contains 2.70% by weight of components having a weight-average molecular weight of <500.

Irgacure 2022 is a commercial product from BASF SE, Ludwigshafen (formerly Ciba SC), Germany and is an 80:20 mixture of 2-hydroxy-2-methyl-1-phenyl-1-propanone and phenylbis(2,4,6-trimethylbenzoyl)phosphine oxide.

Jeffcat ZF 10 is a commercial product from Huntsman Performance Products, Everberg, Belgium and is an isocyanate-activating catalyst: N,N,N'-trimethyl-N'-hydroxyethyl bisaminoethyl ether.

Test Methods:
Gel Permeation Chromatography to Determine the Weight-Average Molecular Weight Proportions (GPC)

The eluent used was unstabilized tetrahydrofuran at a flow rate of 0.6 ml/min. The stationary phase used was four series-connected columns from Macherey & Nagel, 2× Nucleogel GPC 100-5 and 2× Nucleogel GPC 50-5. The separation material used was crosslinked polystyrene-divinylbenzene polymer with particle size 5 μm and pore size 50 or 100 Å with a column length of 30 cm and diameter 7.7 mm. Each column had a length of 30 cm and a diameter of 7.7 mm. The calibration was effected with polystyrene calibration in the range from 162 to 8400 g/mol. For evaluation, the software PSS WINGPC Unity from Polymer Standard Services was used.
Measurement of the Dry Layer Thickness of the Photopolymers The physical layer thickness was determined with commercial white light interferometers, for example the instrument FTM-Lite NIR film thickness gauge from Ingenieursbüro Fuchs.

The determination of layer thickness was based in principle on interference phenomena in thin layers. This involved superimposition of lightwaves which have been reflected at two interfaces of different optical density. The undistorted superimposition of the reflected component beams led to periodic brightening and extinguishing in the spectrum of a white continuum radiator (for example halogen lamp). This superimposition is called interference by the person skilled in the art. The interference spectra were measured and evaluated mathematically.

Solids Content

About 1 g of the sample was applied in an uncoated can lid and distributed adequately by means of a paper clip. The can lid and paper clip had been weighed beforehand. The sample together with the paper clip and can lid were dried in an oven at 125° C. for one hour. The solids content was calculated as follows: (final tare weight)*100/(starting tare weight)

Isocyanate Content (NCO Content)

The NCO contents (isocyanate contents) reported were determined to DIN EN ISO 11909.

Water Content

The reported water contents (KF) from solution were determined to DIN 51777.

Preparation of the Substances

Preparation of Polyol 1

A 1 l flask was initially charged with 0.18 g of tin octoate, 374.8 g of ε-caprolactone and 374.8 g of a difunctional polytetrahydrofuran polyether polyol (equivalent weight 500 g/mol OH), which were heated to 120° C. and kept at this temperature until the solids content (proportion of non-volatile constituents) was 99.5% by weight or higher. Subsequently, the mixture was cooled and the product was obtained as a waxy solid.

Preparation of writing monomer 1 (phosphorus thioyltris(oxy-4,1-phenylenimino-carbonyloxy-ethane-2,1-diyl)triacrylate)

A 500 ml round-bottom flask was initially charged with 0.1 g of 2,6-di-tert-butyl-4-methylphenol, 0.05 g of dibutyltin dilaurate (Desmorapid® Z, Bayer MaterialScience AG, Leverkusen, Germany) and 213.07 g of a 27% solution of tris(p-isocyanatophenyl) thiophosphate in ethyl acetate (Desmodur® RFE, product from Bayer MaterialScience AG, Leverkusen, Germany), which were heated to 60° C. Subsequently, 42.37 g of 2-hydroxyethyl acrylate were added dropwise and the mixture was still kept at 60° C. until the isocyanate content had fallen below 0.1%. This was followed by cooling and complete removal of the ethyl acetate under reduced pressure. The product was obtained as a semicrystalline solid.

Preparation of writing monomer 2 (2-({[3-(methylsulphanyl)phenyl]carbamoyl}oxy)ethyl prop-2-enoate)

A 100 ml round-bottom flask was initially charged with 0.02 g of 2,6-di-tert-butyl-4-methylphenol, 0.01 g of Desmorapid® Z, 11.7 g of 3-(methylthio)phenyl isocyanate, and the mixture was heated to 60° C. Subsequently, 8.2 g of 2-hydroxyethyl acrylate were added dropwise and the mixture was still held at 60° C. until the isocyanate content had fallen below 0.1%. This was followed by cooling. The product was obtained as a pale yellow liquid.

Preparation of additive 1 (bis(2,2,3,3,4,4,5,5,6,6,7,7-dodecafluoroheptyl)-(2,2,4-trimethylhexane-1,6-diyl)biscarbamate)

A 2000 ml round-bottom flask was initially charged with 0.02 g of Desmorapid Z and 3.60 g of 2,4,4-trimethylhexane 1,6-diisocyanate (TMDI), and the mixture was heated to 70° C. Subsequently, 11.39 g of 2,2,3,3,4,4,5,5,6,6,7,7-dodecafluoroheptan-1-ol were added dropwise and the mixture was still kept at 70° C. until the isocyanate content had fallen below 0.1%. This was followed by cooling. The product was obtained as a colourless oil.

Preparation of Dye 1

15.0 g of sodium bis(2-ethylhexyl)sulphosuccinate (purchased from Aldrich) were dissolved in 350 ml of water at 50° C. 24.5 g of the dye of the formula

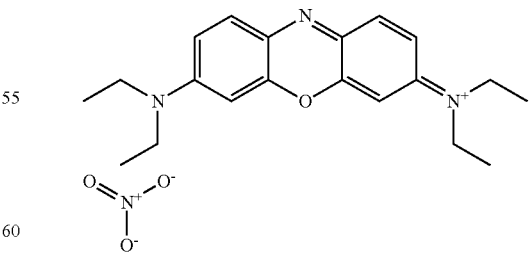

(Basic Blue 3, purchased from DyStar), as 53% by weight material, and 220 ml of butyl acetate were added and the mixture was stirred at 50° C. for 4 h. The aqueous phase was removed and the organic phase was stirred three times with 50 ml of fresh water at 50° C. Finally, the aqueous phase was removed every time, the last at room temperature. The deep blue organic phase was freed of the residual water by azeotropic distillation at 150 mbar and concentrated to approx. 120 g. By adding anhydrous butanone and butyl acetate, 250 g of deep blue solution were finally prepared, the solvent content of which consisted of these two solvents in equal portions. It was 9.68% by weight of the dye of the formula

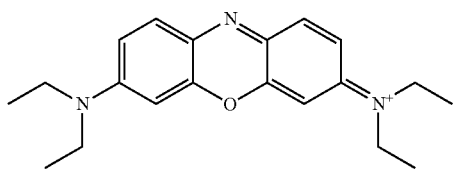

(96.4% of theory).

Water content (KF): 0.1%

$\lambda_{max}$ in methanol: 643 nm.

Suitable laser wavelength: 633 nm.

Evaporative concentration of the solution gave 24.2 g of a deep blue glass, which gradually crystallizes in the form of shiny gold prisms.

Preparation of Dye 2

In an analogous manner, 12.1 g of Safranin O (Basic Red 2), which corresponds to a mixture with the dye of the formula

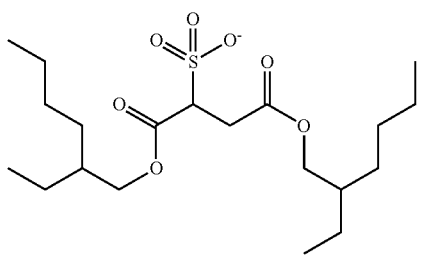

as the main component (purchased from Chemos GmbH, Germany, Cat. No. 1308), were used as 97% by weight material. Finally, 145 g of deep red solution was obtained, the solvent content of which consisted of 35% butanone and 65% butyl acetate. It was 16.4% by weight of the dye of the formula

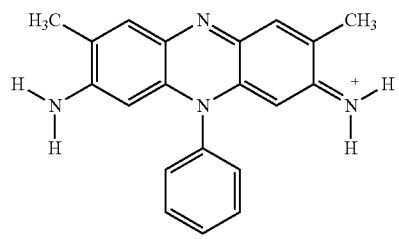

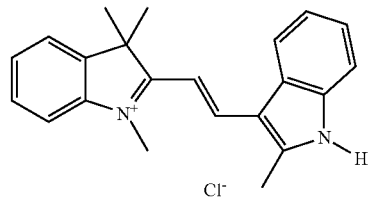

(96.3% of theory).

Water content (KF): 0.1%

$\lambda_{max}$ in methanol: 628 nm.

Suitable laser wavelength: 532 nm.

Preparation of Dye 3

2.78 g of sodium bis(2-ethylhexyl)sulphosuccinate (purchased from Aldrich) were dissolved in 20 ml of ethyl acetate. 2.20 g of the dye of the formula

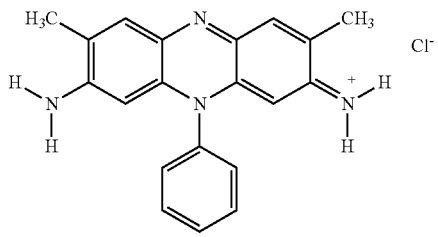

(Basic Orange 21, prepared according to H. Berneth, Methine Dyes and Pigments, Ullmann's Encyclopedia of Industrial Chemistry, Electronic Release, Chapter 6.4.3., Wiley-VCH, Weinheim April 2009) were added. The deep orange mixture was stirred at 45° C. for 8 h, cooled to room temperature and filtered through a fluted filter. This gave a deep orange solution which was first freed of entrained water by azeotropic distillation at standard pressure and then adjusted to mass 23.0 g by addition of anhydrous ethyl acetate. It was 20.0% by weight of the dye of the formula

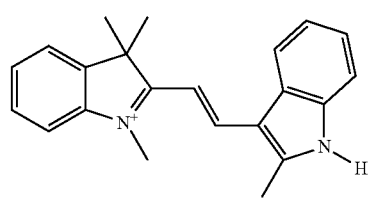

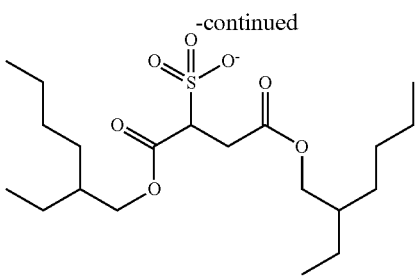

(99.5% of theory).
Water content (KF): 0.04%
$\lambda_{max}$ in methanol: 492 nm.
Suitable laser wavelength: 473 nm.

Production of the Photopolymer Layer 35.59% of polyol 1, 32.5% of a 1:1 mixture of writing monomer 1 and writing monomer 2, 22.5% of additive 1, 0.07% of monobutyltin tris(2-ethylhexanoate), 0.3% of BYK 310 (Byk Gardner, Wesel, Germany) were mixed intimately with one another. To this were added an 80% ethyl acetate solution of 1.7% of coinitiator 1, 0.26% of dye 1, 0.13% of dye 2 and 0.13% of dye 3, and then the mixture was mixed intimately again. Subsequently, 6.82% of Desmodur N3900 was added and, after intimate mixing, the photopolymer composition was applied to a 36 μm PET substrate film with wet film thickness 16 μm at 1.2 m/min by means of a coating bar process on a coating system. After drying at 85° C., a non-tacky photopolymer layer of thickness approx. 14.5 nm was obtained, which was laminated with a 40 μm PE film.

Exposure of the Photopolymer Layers with Red and Green Test Holograms

Figure 2:
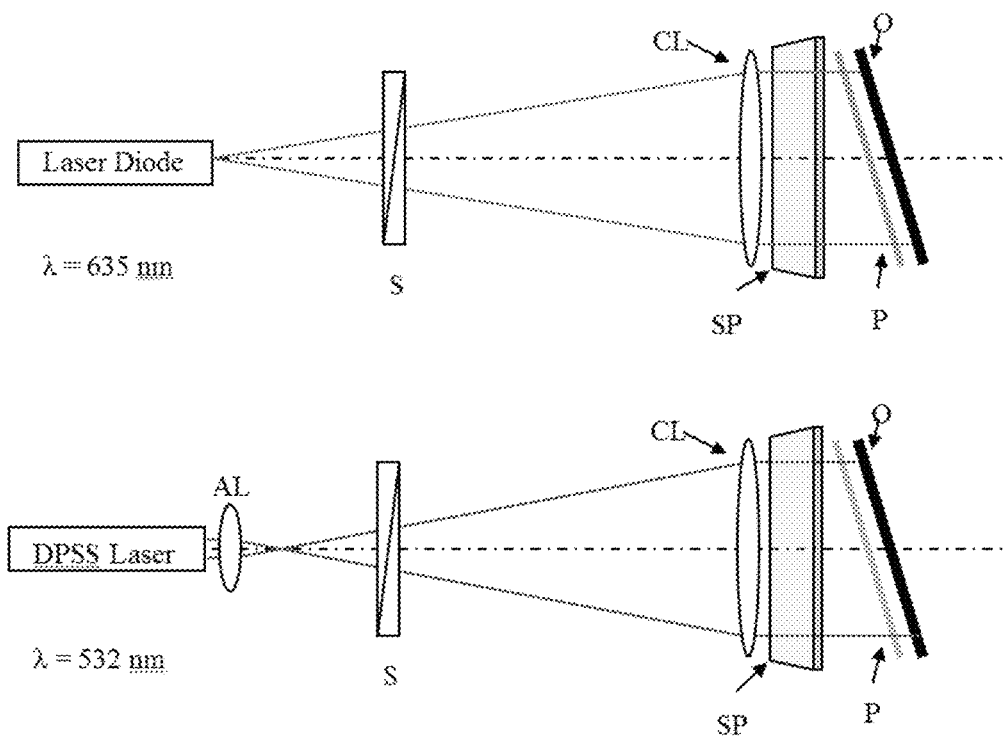
FIG. 2 is a diagram illustrating the testing configurations for wavelengths of 635 and 532 nm.

To produce the test holograms (see FIG. 2), the beam of a laser (emission wavelength 633 nm, e.g. Larisis SNF, from Coherent, 200 mW, or 532 nm, e.g. RLTMGL-532, 50 mW, Roithner Lasertechnik) was expanded to a diameter of ~3-4 cm with the aid of an optional expanding lens (AF) and the collimation lens (CL) which was positioned after the shutter S. The diameter of the expanded laser beam was determined by the aperture of the open shutter. An inhomogeneous intensity distribution of the expanded laser beam was deliberately ensured. Thus, the edge intensity $P_R$ was ~ only half of the intensity $P_Z$ at the centre of the expanded laser beam. P was to be understood here as power/area. The expanded laser beam first passed through a glass plate at an oblique angle to the beam, which served as a shearing plate (SP). On the basis of the interference pattern which was produced by the two glass surface reflections of the SP and reflected upward, it was possible to see whether the laser emits stably in single mode. In this case, on a matt panel positioned over the SP, a pattern of dark and light strips can be seen. Only in the case of single mode emission were holographic exposures conducted. In the case of the DPSS laser, single mode could be achieved by adjusting the pump flow. The expanded beam passed through the photopolymer layer at an oblique angle of about 15°, which serves as the holographic medium (P); this portion formed the reference beam in order then to be reflected back into P by the object (O) arranged parallel to P. This portion then formed the signal beam of the Denisyuk arrangement.

The interference of the signal and reference beams in P produced the hologram in the photopolymer layer. O consisted of a metal plate covered with white paper, with the paper side P facing forward. On the paper was a square grid produced by black lines. The edge length of one square was 0.5 cm. This pattern was also imaged in the hologram in the holographic exposure of P.

Figure 3:
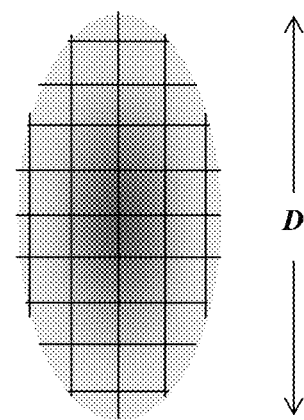
FIG. 3 is an illustration to the elliptical shape of the hologram written in FIG. 2.

The mean exposure dose $E_{ave}$ was adjusted by the opening time t of S. For a fixed laser power I, t was therefore the parameter proportional to $E_{ave}$. The opening time for the exposures was set to 1 second at 633 nm and to 4 seconds at 532 nm. Since the expanded laser beam had an inhomogeneous (bell-shaped) intensity distribution, there was a variation in the local dose E for production of the hologram in P. This led, together with the oblique position of P and O to the optical axis, to the result that the written hologram was of elliptical shape, as shown in FIG. 3.

For the exposure, the film specimens were first cut to size, the PE lamination film was removed and they were laminated by hand onto a glass slide. After the exposure, the test hologram was twice incoherently exposed and bleached and thus photonically fixed under a UV lamp (fusion UV 558434 KR 85, 80 W/cm2) at a belt speed of 2.5 m/min.

Production of the Laminate Structures

All components of the protective layer were mixed intimately in a Speedmixer for one minute. The levelling additive was added last. The mixtures were slightly turbid after the mixing. Subsequently, they were coated directly onto the exposed photopolymer layer with the test hologram in a thickness of 30 μm using a coating bar. For direct comparison, only half of the test hologram was covered. Subsequently, the radiation-curing layer was run under a UV lamp (fusion UV 558434 KR 85, 80 W/cm2) at 2.5 m/min on a conveyor belt and thus cured. The laminate structure was then dry.

The protective layers of the examples contained, as specified in Table 1, various radiation-curing resins I), an isocyanate-functional resin II), a photoinitiator system III), a levelling aid and optionally a catalyst.

Measurement and Assessment of Colour Shift

The laminate structures produced were each treated with a pressure-sensitive adhesive tape based on polyacrylate (Riwo electrical adhesive tape obtainable from FLEXcon, Glenrothes, UK), or treated with acetone and with ethyl acetate. For this purpose, the pressure-sensitive adhesive tape based on polyacrylate was laminated on at room temperature, or acetone and ethyl acetate as liquids were dripped onto it at room temperature. Then they were left for a contact time of 5 minutes. Subsequently, the colour shifts were assessed visually.

The best mark "1" was given when no visual change in the hologram under the protective layer was observed. The worst mark "6" was given when the red hologram had completely disappeared. The following table describes the visual assessments for green and red test holograms in detail:

| Mark | Visual assessment of the red hologram | Visual assessment of the green hologram |
|---|---|---|
| 1 | No change | No change |
| 2 | Hologram has lost a minimal amount of brightness | Hologram shows a slight colour change to green/yellowish. |
| 3 | Hologram has lost brightness | Hologram is green/yellowish |
| 4 | Hologram has lost a lot of brightness | Mark is not given |
| 5 | Hologram can still be seen only on close examination with a torch | Hologram is orange. |
| 6 | Hologram is no longer visible | Mark is not given |

The results of the measurement and assessment of the colour shift are shown in Table 2, with the arithmetic mean of the six marks given reported in each case.

In addition, Table 2 reproduces the results of the GPC analysis of the radiation-curing resins I). The results of the GPC analysis of the isocyanate-functional resins II are listed under "Raw materials".

For an inventive laminate structure, the visual assessment after application of pressure-sensitive adhesive or solvent does not show any change in the hologram, or shows only a minimal loss of brightness (in the red hologram) or a slight colour change (in the green hologram). Inventive laminate structures have an arithmetic mean mark of <2.

Determination of Adhesion Properties

For the determination of the adhesion properties of the protective layer, the five-layer structure according to FIG. 1 was analysed.

To produce the five-layer structure according to FIG. 1, as described above, a photopolymer layer was produced and a red or green hologram was incorporated by exposure. Then one of the protective layers according to Examples 1-6 or Comparative Examples C1-C15 was applied to a photopolymer layer in each case. Finally, the pressure-sensitive adhesive tape was laminated onto the protective layer at room temperature.

The laminate structure thus consisted of a PET substrate (S1) 1 with the photopolymer layer (PP) 2 thereon. Atop this was the protective layer (UV) 3, above that the pressure-activable adhesive layer (PSA) 4, and atop that in turn the substrate film of the pressure-activable adhesive layer (S2) 5. By manually pulling on the two substrate layers 1 and 5, a test was conducted as to what force expenditure enabled separation. In addition, a visual study was conducted as to whether an adhesive or cohesive fracture was present. The following variants were observed: adhesive fracture at the interfaces between S1-PP, PP-UV, UV-PSA and PSA-S2, and a cohesive fracture in S1, PP, UV, PSA and S2. A combination of all nine possibilities was also observed, in which case such an adhesion property profile led to destruction/division of the intermediate layers.

In addition, the adhesive force was assessed qualitatively, using the following notation:

0=adhesion is so strong that separation by manual means is impossible.
1=significant force expenditure is needed to separate the laminate structure.
2=moderate force expenditure is needed to separate the laminate structure.
3=normal force expenditure is sufficient to pull the layers apart.
4=the layers can easily be pulled apart.
5=the layers do not adhere to one another.

The adhesion test followed >7 days after the production of the laminate structure. It was important for an inventive laminate structure that the interface between radiation-curing layer ("UV") and photopolymer layer ("PP") could not be separated. An adhesive fracture between PP-UV was therefore assessed as unacceptable and hence not in accordance with the invention. Desired inventive adhesion properties are a cohesive fracture in PP or PSA and an adhesive fracture between S1-PP or PSA-S2, since the layer composite between PP and UV then remains intact. Likewise in accordance with the invention is a combination of various adhesive and/or cohesive fractures since the laminate structure is then torn apart and manipulation of the structure becomes visible. A prerequisite for an inventive laminate structure is adhesive forces having the assessment "0" and "1", since manipulation of the laminate structure is made much more difficult in this case.

The results for the adhesion properties of inventive Examples 1-6 and laminate structures of Comparative Examples C1-C15 can be found in Table 3.

Table 3 likewise reports, as well as the manual testing of the adhesive force, also the position of adhesion failure (with dark shading) in the laminate structure. If several positions are shaded, the adhesive failure took place at several points in the laminate structure. This led to destruction of the overall structure. In addition, Table 3 contains a qualitative assessment which gives a statement as to whether the structure withstands third-party manipulation (for example in a security application).

Inventive laminate structures simultaneously meet the following conditions:
   a) no visible colour shift, i.e. a small colour shift characterized by a mark better than "2" (<2) and simultaneously;
   b) the two layers have good adhesion to one another, i.e. an adhesive force of "0" or "1" and no adhesive fracture between photopolymer layer ("PP") and protective layer ("UV").

Comparative Examples $C_1$-$C_4$ did not contain any isocyanate-functional resin II) and did not have good adhesion properties throughout (see Table 3). C5 likewise did not exhibit good adhesive properties. Comparative Examples C6-C15 exhibited too high a colour shift (see Table 2), but predominantly good adhesion properties.

Only the inventive laminate structures of Examples 1-6 had both a minimal, acceptable colour shift (Table 2) and good adhesion properties (Table 3).

All radiation-curing resins I) used in inventive Examples 1-6 featured ≤5% by weight of compounds having a weight-average molecular weight of <500 and ≥75% by weight of compounds having a weight-average molecular weight of >1000. In addition, in the inventive laminate structures of Examples 1-6, an isocyanate-functional resin II) was used which contained ≤5% by weight of compounds having a weight-average molecular weight of <500.

TABLE 1

| Experiment | Radiation-curing resin I) | Weight [g] | NCO resin II) | Weight [g] | Levelling agent | Weight [g] | Photoinitiator III) | Weight [g] | Catalyst | Weight [g] |
|---|---|---|---|---|---|---|---|---|---|---|
| C1 | Resin 1 | 9 | | | BYK 310 | 0.27 | Irgacure 2022 | 0.45 | | |
| C2 | Resin 2 | 18 | | | BYK 310 | 0.54 | Irgacure 2022 | 0.9 | | |
| C3 | Resin 3 | 18 | | | BYK 310 | 0.54 | Irgacure 2022 | 0.9 | | |
| C4 | Resin 4 | 18 | | | BYK 310 | 0.54 | Irgacure 2022 | 0.9 | | |
| 1 | Resin 1 | 27 | Resin A | 3 | BYK 310 | 0.9 | Irgacure 2022 | 1.5 | Jeffkat ZF10 | 0.032 |
| 2 | Resin 2 | 27 | Resin A | 3 | BYK 310 | 0.9 | Irgacure 2022 | 1.5 | Jeffkat ZF10 | 0.032 |
| 3 | Resin 2 | 27 | Resin B | 3 | BYK 310 | 0.9 | Irgacure 2022 | 1.5 | | |
| 4 | Resin 3 | 27 | Resin A | 3 | BYK 310 | 0.9 | Irgacure 2022 | 1.5 | | |
| 5 | Resin 4 | 9 | Resin A | 1 | BYK 310 | 0.3 | Irgacure 2022 | 0.3 | | |
| 6 | Resin 3 | 27 | Resin B | 3 | BYK 310 | 0.9 | Irgacure 2022 | 1.5 | | |
| C5 | Resin 5 | 18 | Resin A | 2 | BYK 310 | 0.6 | Irgacure 2022 | 1 | | |
| C6 | Resin 6 | 18 | Resin A | 2 | BYK 310 | 0.6 | Irgacure 2022 | 1 | | |
| C7 | Resin 7 | 18 | Resin A | 2 | BYK 310 | 0.6 | Irgacure 2022 | 0.8 | | |
| C8 | Resin 8 | 18 | Resin A | 2 | BYK 310 | 0.6 | Irgacure 2022 | 1 | | |

TABLE 1-continued

| Experiment | Radiation-curing resin I) | Weight [g] | NCO resin II) | Weight [g] | Levelling agent | Weight [g] | Photoinitiator III) | Weight [g] | Catalyst | Weight [g] |
|---|---|---|---|---|---|---|---|---|---|---|
| C9  | Resin 9  | 18 | Resin A | 2 | BYK 310 | 0.6 | Irgacure 2022 | 0.8 | | |
| C10 | Resin 10 | 18 | Resin A | 2 | BYK 310 | 0.6 | Irgacure 2022 | 0.8 | | |
| C11 | Resin 11 | 18 | Resin A | 2 | BYK 310 | 0.6 | Irgacure 2022 | 1   | | |
| C12 | Resin 12 | 18 | Resin A | 2 | BYK 310 | 0.6 | Irgacure 2022 | 1   | | |
| C13 | Resin 13 | 18 | Resin A | 2 | BYK 310 | 0.6 | Irgacure 2022 | 0.8 | | |
| C14 | Resin 14 | 18 | Resin A | 2 | BYK 310 | 0.6 | Irgacure 2022 | 1   | | |
| C15 | Resin 15 | 18 | Resin A | 2 | BYK 310 | 0.6 | Irgacure 2022 | 0.8 | | |

TABLE 2

| Example | Resin I) | Mw <500 (g/mol) | Mw >1000 (g/mol) | Marks AVR | Colour shift of red hologram | | | Colour shift of green hologram | | |
|---|---|---|---|---|---|---|---|---|---|---|
| | | | | | PSA | acetone | ethyl acetate | PSA | acetone | ethyl acetate |
| C1  | Resin 1  | 2.87%  | 85.62% | 1.0 | 1.0 | 1.0 | 1.0 | 1.0 | 1.0 | 1.0 |
| C2  | Resin 2  | 1.93%  | 79.01% | 1.1 | 1.0 | 1.0 | 1.0 | 1.5 | 1.0 | 1.0 |
| C3  | Resin 3  | 3.21%  | 85.96% | 1.3 | 2.0 | 1.0 | 1.0 | 1.5 | 1.0 | 1.0 |
| C4  | Resin 4  | 1.82%  | 95.51% | 1.1 | 1.0 | 1.0 | 1.0 | 1.5 | 1.0 | 1.0 |
| 1   | Resin 1  | 2.87%  | 85.62% | 1.0 | 1.0 | 1.0 | 1.0 | 1.0 | 1.0 | 1.0 |
| 2   | Resin 2  | 1.93%  | 79.01% | 1.0 | 1.0 | 1.0 | 1.0 | 1.0 | 1.0 | 1.0 |
| 3   | Resin 2  | 1.93%  | 79.01% | 1.0 | 1.0 | 1.0 | 1.0 | 1.0 | 1.0 | 1.0 |
| 4   | Resin 3  | 3.21%  | 85.96% | 1.0 | 1.0 | 1.0 | 1.0 | 1.0 | 1.0 | 1.0 |
| 5   | Resin 4  | 1.82%  | 95.51% | 1.0 | 1.0 | 1.0 | 1.0 | 1.0 | 1.0 | 1.0 |
| 6   | Resin 3  | 3.21%  | 85.96% | 1.7 | 3.0 | 1.0 | 3.0 | 1.0 | 1.0 | 1.0 |
| C5  | Resin 5  | 2.22%  | 62.67% | 1.5 | 1.0 | 1.0 | 1.0 | 2.0 | 2.0 | 2.0 |
| C6  | Resin 6  | 5.13%  | 79.73% | 2.0 | 2.0 | 2.0 | 2.0 | 2.0 | 2.0 | 2.0 |
| C7  | Resin 7  | 7.25%  | 77.41% | 2.2 | 3.0 | 3.0 | 3.0 | 2.0 | 1.0 | 1.0 |
| C8  | Resin 8  | 8.21%  | 57.60% | 2.5 | 3.0 | 3.0 | 3.0 | 2.0 | 2.0 | 2.0 |
| C9  | Resin 9  | 1.02%  | 73.84% | 2.5 | 3.0 | 3.0 | 3.0 | 2.0 | 2.0 | 2.0 |
| C10 | Resin 10 | 7.82%  | 79.88% | 2.7 | 3.0 | 5.0 | 5.0 | 1.0 | 1.0 | 1.0 |
| C11 | Resin 11 | 29.52% | 57.63% | 3.3 | 4.0 | 6.0 | 5.0 | 1.0 | 2.0 | 2.0 |
| C12 | Resin 12 | 11.84% | 82.05% | 3.7 | 4.0 | 6.0 | 5.0 | 2.0 | 2.0 | 3.0 |
| C13 | Resin 13 | 16.67% | 51.57% | 4.3 | 5.0 | 5.0 | 5.0 | 3.5 | 3.5 | 3.5 |
| C14 | Resin 14 | 14.13% | 79.38% | 4.6 | 5.0 | 5.0 | 6.0 | 4.0 | 4.0 | 3.5 |
| C15 | Resin 15 | 11.50% | 63.14% | 4.5 | 5.0 | 5.0 | 5.0 | 5.0 | 3.5 | 3.5 |

TABLE 3

| | UV resin | NCO resin | Adhesion | Adhesion Fracture | Laminate Structure S1 | S1-PP | PP | PP-UV | UV | UV-PSA | PSA | PSA-S2 | S2 | Results | Assessment |
|---|---|---|---|---|---|---|---|---|---|---|---|---|---|---|---|
| C1 | Resin 1 | | 2 | UV-PSA | | | | | | ▓ | | | | PSA has weak ad-hesion | No, because too weak |
| C2 | Resin 2 | | 2 | UV-PSA | | | | | | ▓ | | | | PSA has weak ad-hesion | No, because too weak |
| C3 | Resin 3 | | 2 | UV-PSA | | | | | | ▓ | | | | PSA has weak ad-hesion | No, because too weak |
| C4 | Resin 4 | | 2 | S1-PP, UV-PSA, PSA-S2 | | ▓ | | | | ▓ | | ▓ | | Destruc-tion of PP and UV | Yes, because structure is destroyed |
| 1 | Resin 1 | Resin A | 1 | PSA | | | | | | | ▓ | | | Cohesive PSA frac-ture | Yes, because laminate remains intact |
| 2 | Resin 2 | Resin A | 0-1 | PSA | | | | | | | ▓ | | | Cohesive PSA frac-ture | Yes, because laminate remains intact |
| 3 | Resin 2 | Resin B | 1 | PSA | | | | | | | ▓ | | | Cohesive PSA frac-ture | Yes, because laminate remains intact |

TABLE 3-continued

| | UV resin | NCO resin | Adhesion | Adhesion Fracture | Laminate Structure S1 | S1-PP | PP | PP-UV | UV | UV-PSA | PSA | PSA-S2 | S2 | Results | Assessment |
|---|---|---|---|---|---|---|---|---|---|---|---|---|---|---|---|
| 4 | Resin 3 | Resin A | 0-1 | PP-UV, PSA | | | | ▓ | | | ▓ | | | Cohesive PSA frac-ture with cracks in UV | Yes, because structure is destroyed |
| 5 | Resin 4 | Resin A | 1 | PSA | | | | | | | ▓ | | | Cohesive PSA frac-ture | Yes, because laminate remains intact |
| 6 | Resin 3 | Resin B | 1 | PSA, PSA-S2 | | | | | | | ▓ | ▓ | | Cohesive PSA fracture with delamination of S2 | Yes, because laminate remains intact |
| C5 | Resin 5 | Resin A | 4 | UV-PSA | | | | | | ▓ | | | | PSA has no adhesion | No, because too weak |
| C6 | Resin 6 | Resin A | 0 | S1-PP, PP-UV | | ▓ | ▓ | | | | | | | Destruction of PP | Yes, because structure destroyed |
| C7 | Resin 7 | Resin A | 2 | UV-PSA | | | | | | ▓ | | | | PSA has weak adhesion | No, because too weak |
| C8 | Resin 8 | Resin A | 0 | PSA | | | | | | | ▓ | | | Cohesive PSA fracture | Yes, because composite remains intact |
| C9 | Resin 9 | Resin A | 0-1 | S1-PP, PP-UV | | ▓ | ▓ | | | | | | | Destruction of PP | Yes, because structure destroyed |
| C10 | Resin 10 | Resin A | 1-2 | PP-UV, PSA | | | | ▓ | | | ▓ | | | Destruction of PP and PSA | Yes, because structure destroyed |
| C11 | Resin 11 | Resin A | 0 | S1-PP, PP-UV | | ▓ | ▓ | | | | | | | Destruction of PP | Yes, because structure destroyed |
| C12 | Resin 12 | Resin A | 0 | PSA | | | | | | | ▓ | | | Cohesive PSA fracture | Yes, because laminate remains intact |
| C13 | Resin 13 | Resin A | 0 | PSA | | | | | | | ▓ | | | Cohesive PSA frac-ture | Yes, because laminate remains intact |
| C14 | Resin 14 | Resin A | 0 | PSA | | | | | | | ▓ | | | Cohesive PSA fracture | Yes, because laminate remains intact |
| C15 | Resin 15 | Resin A | 0 | PSA | | | | | | | ▓ | | | Cohesive PSA fracture | Yes, because laminate remains intact |

The invention claimed is:

1. A laminate structure comprising a protective layer in direct contact with an exposed photopolymer layer, the protective layer being formed by mixing at least one radiation-curing resin I); a curable isocyanate-functional resin II); and a photoinitiator system III), wherein the radiation-curing resin I) containing up to 5% by weight of compounds having a weight-average molecular weight of less than 500 and 75% or more by weight of compounds having a weight-average molecular weight of more than 1000, the isocyanate-functional resin II) containing up to 5% by weight of compounds having a weight-average molecular weight of less than 500, and the protective layer containing the radiation-curing resin I) at least to an extent of 80% by weight and the isocyanate-functional resin II) from 3% to 15% by weight, and wherein a hologram recorded in the laminar structure does not exhibit a color shift.

2. The laminate structure of claim 1, wherein the photopolymer layer comprises crosslinked matrix polymers A) obtainable by reacting at least one polyisocyanate component a) and an isocyanate-reactive component b), crosslinked writing monomers B), a photoinitiator C) and a catalyst D).

3. The laminate structure of claim 2, characterized in that the writing monomers B) are photochemically crosslinked acrylates.

4. The laminate structure of claim 1, wherein the radiation-curing resin I) comprises at least one polyester-, polyether-, polycarbonate- and/or polyurethane-containing binder having free-radically polymerizable groups-.

5. The laminate structure of claim 4, wherein the free-radically polymerizable groups are acryloyl, methacryloyl, allyl, vinyl, maleyl, and/or fumaryl groups.

6. The laminate structure of claim 4, wherein the free-radically polymerizable groups are acryloyl groups.

7. The laminate structure of claim 4, wherein the free-radically polymerizable groups are acryloyl, methacryloyl, allyl, vinyl, maleyl, and/or fumaryl groups.

8. The laminate structure of claim 1, wherein the radiation-curing resin I) comprises at least one compound selected from the group of the polyether acrylates, polyester acrylates, aliphatic urethane acrylates, aromatic urethane acrylates and epoxy acrylates.

9. The laminate structure of claim 1, wherein the radiation-curing resin I) contains up to 4% by weight of compounds having a weight-average molecular weight of less than 500 and 77% or more by weight of compounds having a weight-average molecular weight of more than 1000.

10. The laminate structure of claim 1, wherein the curable isocyanate-functional resin II) comprises at least one aliphatic, araliphatic, aliphatic or aromatic isocyanate-containing binder.

11. The laminate structure of claim 10, wherein the isocyanate-containing binder is an isocyanate-functional prepolymer comprising reacting a polyfunctional alcohol with an excess of diisocyanate.

12. The laminate structure of claim 1, wherein the curable isocyanate-functional resin II) additionally has (meth)acrylate groups.

13. The laminate structure of claim 1, wherein the curable isocyanate-functional resin II) contains up to 4% by weight of compounds having a weight-average molecular weight of less than 500.

14. The laminate structure of claim 1, wherein the photoinitiator system III) comprises at least one compound selected from the group of 2-hydroxyphenyl ketones, 1-hydroxycyclohexyl phenyl ketone, benzil ketals, benzil dimethyl ketal, acylphosphine oxides, bis(2,4,6-trimethylbenzoyl)phenylphosphine oxide, diacylphosphine oxides, benzophenone and derivatives thereof.

15. The laminate structure of claim 1, wherein the photopolymer layer comprises additives of the general formula (VII)

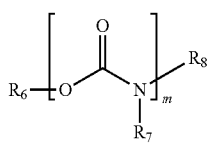

(VII)

where m is ≥1 and ≤8 and $R^6$, $R^7$, $R^8$ are linear, branched, cyclic or heterocyclic unsubstituted or optionally heteroatom-substituted organic radicals.

16. The laminate structure of claim 1, wherein the photopolymer layer comprises a hologram incorporated by exposure.

17. A process for producing a laminate structure of claim 1, comprising applying a mixture at least comprising the radiation-curing resin I), the curable isocyanate-functional resin II) and the photoinitiator system III) to the exposed photopolymer layer and curing.

18. A security card, a banknote, a printed article, an optical structure, an electronic display, comprising the laminate structure of claim 1.

19. The laminate structure of claim 1, wherein the radiation-curing resin I) comprises at least one aliphatic urethane acrylate and/or aromatic urethane acrylate.

20. The laminate structure of claim 1, wherein the radiation-curing resin I) contains up to 3.5% by weight of compounds having a weight-average molecular weight of less than 500 and 79% or more by weight of compounds having a weight-average molecular weight of more than 1000.

21. The laminate structure of claim 1, wherein the curable isocyanate-functional resin II) contains up to 3% by weight of compounds having a weight-average molecular weight of less than 500.

22. The laminate structure of claim 1, wherein the protective layer contains from 5% to 15% by weight of the curable isocyanate-functional resin II).

23. The laminate structure of claim 1, wherein the protective layer contains from 8% to 12% by weight of the curable isocyanate-functional resin II).

24. A laminate structure comprising a protective layer in direct contact with an exposed photopolymer layer, the protective layer being formed by reacting at least one radiation-curing resin I); an curable isocyanate-functional resin II); and a photoinitiator system III), wherein the radiation-curing resin I) containing up to 5% by weight of compounds having a weight-average molecular weight of less than 500 and 75% or more by weight of compounds having a weight-average molecular weight of more than 1000, the isocyanate-functional resin II) containing up to 5% by weight of compounds having a weight-average molecular weight of less than 500, and the protective layer containing the radiation-curing resin I) at least to an extent of 80% by weight and the isocyanate-functional resin II) at most to an extent of 15% by weight, wherein the photopolymer layer comprises additives of the general formula (VII)

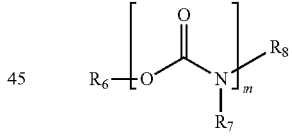

(VII)

where m is ≥1 and ≤8 and $R^6$, $R^7$, $R^8$ are linear, branched, cyclic or heterocyclic unsubstituted or optionally heteroatom-substituted organic radicals and wherein a hologram recorded in the laminar structure does not exhibit a color shift.

25. The laminate structure of claim 24, wherein at least one of $R^6$, $R^7$, $R^8$ is substituted with at least a fluorine atom.

* * * * *